(12) United States Patent
Herz et al.

(10) Patent No.: US 8,977,986 B2
(45) Date of Patent: Mar. 10, 2015

(54) CONTROL PANEL AND RING INTERFACE FOR COMPUTING SYSTEMS

(75) Inventors: William Herz, Hayward, CA (US); Charles Goertz, Etobicoke (CA); Susan Greenfield, Toronto (CA)

(73) Assignee: Advanced Micro Devices, Inc., Sunnyvale, CA (US)

( * ) Notice: Subject to any disclaimer, the term of this patent is extended or adjusted under 35 U.S.C. 154(b) by 622 days.

(21) Appl. No.: 13/328,105

(22) Filed: Dec. 16, 2011

(65) Prior Publication Data

US 2012/0173982 A1 Jul. 5, 2012

Related U.S. Application Data

(60) Provisional application No. 61/429,946, filed on Jan. 5, 2011, provisional application No. 61/429,950, filed on Jan. 5, 2011.

(51) Int. Cl.
| | |
|---|---|
| *G06F 3/0481* | (2013.01) |
| *G06F 3/0484* | (2013.01) |
| *G06F 3/0482* | (2013.01) |
| *G06F 3/0483* | (2013.01) |
| *G06F 3/0485* | (2013.01) |
| *G06F 3/0488* | (2013.01) |

(52) U.S. Cl.
CPC .......... *G06F 3/04847* (2013.01); *G06F 3/0482* (2013.01); *G06F 3/0483* (2013.01); *G06F 3/0485* (2013.01); *G06F 3/04883* (2013.01)
USPC ........... 715/850; 715/810; 715/781; 715/719; 715/848

(58) Field of Classification Search
CPC .................................................... G06F 3/04815
USPC ........................................................... 715/850
See application file for complete search history.

(56) References Cited

U.S. PATENT DOCUMENTS

| | | | |
|---|---|---|---|
| 6,184,884 B1 * | 2/2001 | Nagahara et al. | 715/828 |
| 6,266,098 B1 * | 7/2001 | Cove et al. | 348/563 |
| 6,411,337 B2 * | 6/2002 | Cove et al. | 348/563 |
| 6,448,987 B1 | 9/2002 | Easty et al. | |
| 6,600,936 B1 | 7/2003 | Karkkainen et al. | |
| 6,662,177 B1 | 12/2003 | Martino et al. | |
| 6,690,391 B1 * | 2/2004 | Proehl et al. | 715/720 |
| 6,970,749 B1 | 11/2005 | Chinn et al. | |
| 7,036,091 B1 | 4/2006 | Nguyen | |

(Continued)

FOREIGN PATENT DOCUMENTS

| | | |
|---|---|---|
| EP | 1795998 | 6/2007 |
| EP | 2158951 | 3/2010 |

OTHER PUBLICATIONS

SPB Mobile Shell 3.5 User Manual manufactured by SPB Software, available online at [http://spb.com/uploads/user_manuals/SPB_Mobile_Shell_User_Manual_Symbian.pdf], Dec. 31, 2010.*

(Continued)

*Primary Examiner* — Reza Nabi

(74) *Attorney, Agent, or Firm* — Timothy M. Honeycutt

(57) ABSTRACT

In a system including a display and a selection device, a method of providing and selecting multiple control panels on the display includes providing a user interface on the display. The user interface includes an object that has an axis and is user-scrollable about the axis to selectively bring each of the multiple control panels into and out of view.

12 Claims, 20 Drawing Sheets

(56) References Cited

U.S. PATENT DOCUMENTS

| | | | |
|---|---|---|---|
| 7,271,734 B2 * | 9/2007 | Sata et al. ................ | 340/12.54 |
| 7,562,312 B2 * | 7/2009 | Rochford et al. ............ | 715/848 |
| 7,581,182 B1 | 8/2009 | Herz | |
| 7,685,619 B1 | 3/2010 | Herz | |
| 7,742,105 B2 | 6/2010 | Lee et al. | |
| 7,761,607 B2 | 7/2010 | Hassan et al. | |
| 7,788,600 B2 | 8/2010 | Lau et al. | |
| 8,284,201 B2 | 10/2012 | Lindfors | |
| 8,284,633 B2 | 10/2012 | Lazaridis et al. | |
| 8,375,334 B2 * | 2/2013 | Nakano et al. ............. | 715/848 |
| 8,407,615 B2 * | 3/2013 | Berrill ........................ | 715/781 |
| 8,519,987 B2 * | 8/2013 | Bonne ........................ | 345/184 |
| 8,621,359 B2 * | 12/2013 | Cao et al. ................... | 715/734 |
| 8,667,418 B2 * | 3/2014 | Chaudhri et al. ........... | 715/835 |
| 8,745,535 B2 * | 6/2014 | Chaudhri et al. ........... | 715/850 |
| 8,745,540 B2 * | 6/2014 | Lee et al. .................... | 715/855 |
| 8,836,658 B1 * | 9/2014 | Jia et al. ...................... | 345/173 |
| 2001/0028369 A1 * | 10/2001 | Gallo et al. ................. | 345/848 |
| 2003/0217117 A1 | 11/2003 | Dan et al. | |
| 2004/0066396 A1 | 4/2004 | Hatakenaka | |
| 2004/0207766 A1 * | 10/2004 | Sata et al. ................... | 348/734 |
| 2005/0020238 A1 | 1/2005 | Eastman et al. | |
| 2005/0076312 A1 | 4/2005 | Gardner et al. | |
| 2005/0280856 A1 | 12/2005 | Kim et al. | |
| 2006/0123361 A1 * | 6/2006 | Sorin et al. ................. | 715/854 |
| 2006/0218506 A1 | 9/2006 | Srenger et al. | |
| 2006/0282792 A1 * | 12/2006 | Berrill ........................ | 715/781 |
| 2007/0026371 A1 * | 2/2007 | Wood .......................... | 434/317 |
| 2007/0164989 A1 * | 7/2007 | Rochford et al. ........... | 345/156 |
| 2008/0022228 A1 | 1/2008 | Kwon et al. | |
| 2008/0168381 A1 * | 7/2008 | Nelson et al. .............. | 715/780 |
| 2008/0295037 A1 * | 11/2008 | Cao et al. ................... | 715/852 |
| 2008/0316551 A1 * | 12/2008 | Taylor et al. ............... | 358/498 |
| 2009/0019401 A1 * | 1/2009 | Park et al. ................... | 715/841 |
| 2009/0267909 A1 * | 10/2009 | Chen et al. ................. | 345/173 |
| 2009/0307258 A1 | 12/2009 | Priyadarshi et al. | |
| 2010/0085841 A1 | 4/2010 | Lazaridis et al. | |
| 2010/0246856 A1 | 9/2010 | Suzuki | |
| 2010/0328317 A1 | 12/2010 | Lindfors | |
| 2011/0010666 A1 * | 1/2011 | Choi ........................... | 715/810 |
| 2011/0113374 A1 * | 5/2011 | Sheehan et al. ............ | 715/825 |
| 2011/0113380 A1 * | 5/2011 | Sakalowsky et al. ....... | 715/841 |
| 2011/0125809 A1 | 5/2011 | Woods et al. | |
| 2011/0219302 A1 | 9/2011 | Kondo et al. | |
| 2011/0276155 A1 | 11/2011 | Lindahl | |
| 2011/0279461 A1 | 11/2011 | Hamilton, II et al. | |
| 2012/0173975 A1 * | 7/2012 | Herz et al. .................. | 715/716 |
| 2012/0173976 A1 * | 7/2012 | Herz et al. .................. | 715/716 |
| 2012/0198344 A1 | 8/2012 | Tukol et al. | |
| 2012/0226978 A1 * | 9/2012 | Harberts et al. ............ | 715/702 |
| 2013/0104082 A1 * | 4/2013 | Burge et al. ................ | 715/841 |
| 2013/0263018 A1 | 10/2013 | Xiong et al. | |
| 2013/0275921 A1 * | 10/2013 | Lee et al. .................... | 715/855 |
| 2014/0053092 A1 * | 2/2014 | Grevinga et al. ........... | 715/769 |

OTHER PUBLICATIONS

USPTO Office Action notification date Mar. 5, 2013; U.S. Appl. No. 13/328,079.

Microsoft Windows, Dec. 9, 2010 windows.microsoft.com/en-US/windows-vista/The-Start-menu-overview.com*.

SPB Software; *SPB Mobile Shell 3.5 User Manual*; http://spb.com/uploads/user_manuals/SPB_Mobile_Shell_User_Manual.pdf; Dec. 31, 2010; pp. 1-16.

PCT/US2011/066075 International Search Report mailed Apr. 5, 2012.

PCT/US2011/066064 International Search Report mailed May 8, 2012.

USPTO Office Action notification date Sep. 11, 2013; U.S. Appl. No. 13/328,079.

USPTO Office Action notification date Mar. 26, 2013; U.S. Appl. No. 13/328,116.

* cited by examiner

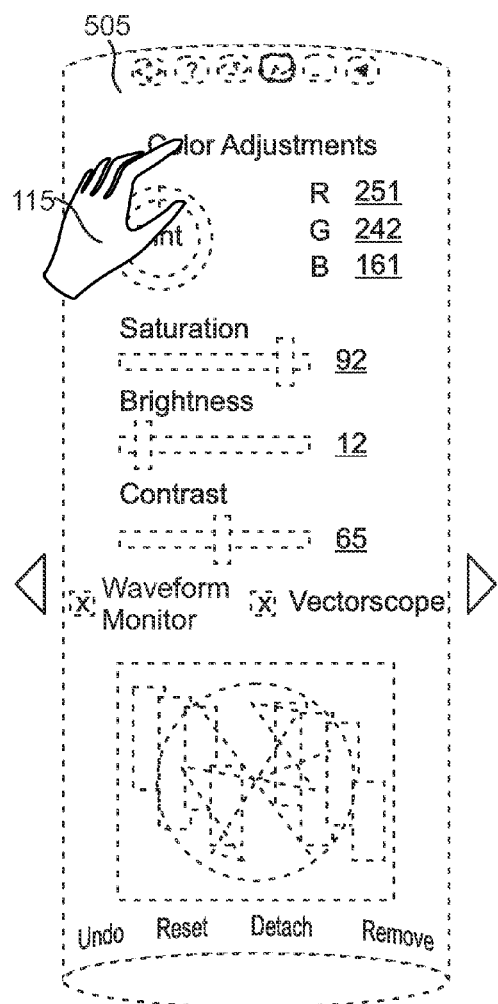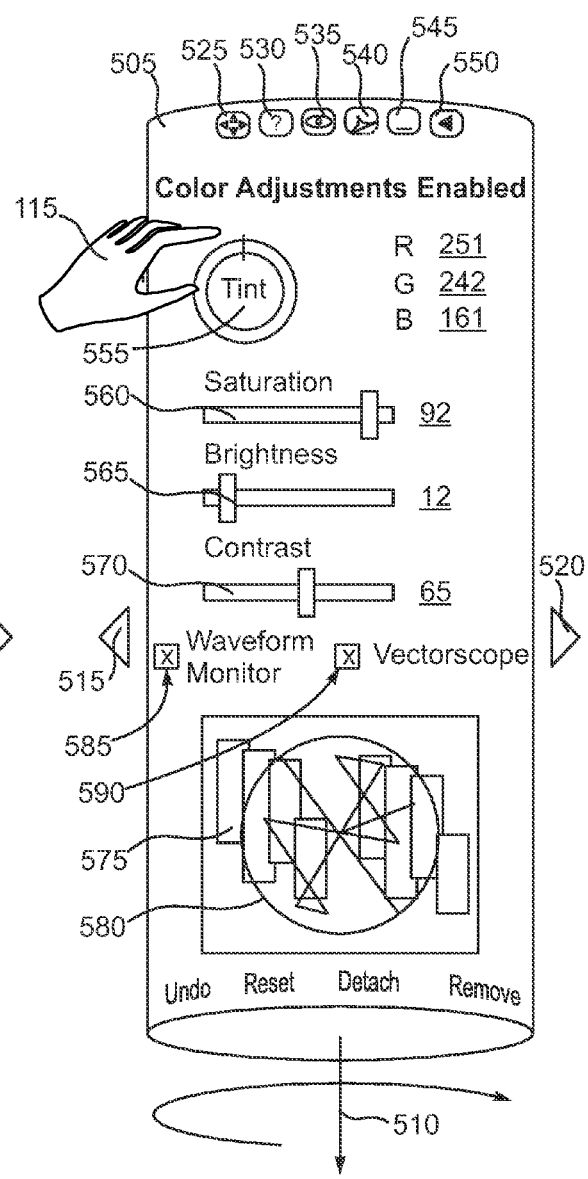
FIG. 25
FIG. 26

US 8,977,986 B2

CONTROL PANEL AND RING INTERFACE FOR COMPUTING SYSTEMS

This application claims benefit under 35 U.S.C. 119(e) of prior provisional application Ser. No. 61/429,946, filed Jan. 5, 2011 and prior provisional application Ser. No. 61/429,950, filed Jan. 5, 2011.

BACKGROUND OF THE INVENTION

1. Field of the Invention

This invention relates generally to computing systems and software, and more particularly to computer readable instructions for generating a user interface for interacting with software programs.

2. Description of the Related Art

Many conventional software applications provide a user interface, that is, a mechanism for a user to direct the action of the software and to receive output from the software. For example, output in the form of menus and icons is presented to a user on a display device, and the user can select from the menus and icons to direct the functions that the application is to perform.

Many conventional user interface menus will present a vertically scrollable menu upon user selection. Selection of a given item in the vertically scrollable menu may cause a sub-menu that is also vertically scrollable to be rendered on the display adjacent to the main menu. Such conventional menus can occupy significant portions of the display. Furthermore, there may simply be practical limits to the number of menu items that can be packed into a conventionally vertically scrollable menu.

Certain types of modern smart phones include the ability to laterally scroll icons and in some cases lists, such as contacts or other items. The vertically scrollable menus are typically included as well.

Inkseine Ver. 1.2.I720.0 is a prototype software program produced by Microsoft Research of Microsoft Corporation and designed for digital inking on a Windows®-based tablet PC. The program includes a user interface that has a two-dimensional main menu ring. The main menu ring, actually in the form of an arc, is not scrollable, but designed to be activated by hovering a tablet PC pen or a cursor at selected locations on the tablet PC screen. Hovering over a main menu item brings up a sub-menu ring that is similarly not scrollable but designed also to be activated by hovering a tablet PC pen or a cursor. The number of icons that can be displayed on the main and sub-menus is presently limited to about ten or so.

The present invention is directed to overcoming or reducing the effects of one or more of the foregoing disadvantages.

SUMMARY OF EMBODIMENTS OF THE INVENTION

In accordance with one aspect of an embodiment of the present invention, in a system including a display and a selection device, a method of providing and selecting multiple control panels on the display includes providing a user interface on the display. The user interface includes an object that has an axis and is user-scrollable about the axis to selectively bring each of the multiple control panels into and out of view.

In accordance with another aspect of an embodiment of the present invention, in a system including a display and a selection device, a method of providing and selecting multiple control panels on the display includes providing a user interface on the display. The user interface includes the multiple control panels arranged as book pages with at least one of the book pages appearing in 3D, the book pages are user-scrollable to selectively bring each of the multiple control panels into and out of user focus.

In accordance with another aspect of an embodiment of the present invention, in a system including a display and a selection device, a method of providing and selecting multiple control panels on the display includes providing a user interface on the display. The user interface includes the multiple control panels arranged as 3D accordion folds that are user-scrollable to selectively bring each of the multiple control panels into and out of user focus.

In accordance with another aspect of an embodiment of the present invention, a method includes providing a computer system and providing a user interface on the computer system. The user interface includes an object that has an axis and is user-scrollable about the axis to selectively bring each of the multiple control panels into and out of view.

In accordance with another aspect of an embodiment of the present invention, a computer readable medium having computer readable instructions for performing a method includes displaying a user interface on a display device. The user interface including an object that has an axis and being user-scrollable about the axis to selectively bring each of multiple control panels into and out of view.

In accordance with another aspect of an embodiment of the present invention, a method includes providing a computer system and a user interface on the computer system. The user interface includes multiple control panels arranged as book pages with at least one of the book pages appearing in 3D. The book pages are user-scrollable to selectively bring each of the multiple control panels into and out of user focus.

In accordance with another aspect of an embodiment of the present invention, a method includes providing a computer system and a user interface on the computer system. The user interface includes multiple control panels arranged as 3D accordion folds. The multiple control panels are user-scrollable to selectively bring each of the multiple control panels into and out of user focus.

In accordance with another aspect of an embodiment of the present invention, a system for displaying video is provided that includes a processor programmed to provide a user interface on a display. The user interface includes an object that has an axis and is user-scrollable about the axis to selectively bring each of multiple control panels into and out of view.

In accordance with another aspect of an embodiment of the present invention, a system for displaying video is provided that includes a processor programmed to provide a user interface on a display. The user interface includes multiple control panels arranged as 3D accordion folds or as book pages with at least one of the book pages appearing in 3D. The accordion folds or book pages being user-scrollable to selectively bring each of the multiple control panels into and out of user focus.

In accordance with another aspect of an embodiment of the present invention, a computer readable medium that has computer readable instructions for performing a method is provided. The method includes displaying a user interface on a display device. The user interface includes an object that has an axis and is user-scrollable about the axis to selectively bring each of multiple control panels into and out of view.

In accordance with another aspect of an embodiment of the present invention, a computer readable medium that has computer readable instructions for performing a method is provided. The method includes displaying a user interface on a display device. The user interface includes multiple control panels arranged as 3D accordion folds or as book pages with at least one of the book pages appearing in 3D, the accordion folds or book pages are user-scrollable to selectively bring each of the multiple control panels into and out of user focus.

BRIEF DESCRIPTION OF THE DRAWINGS

The foregoing and other advantages of the invention will become apparent upon reading the following detailed description and upon reference to the drawings in which:

FIG. 25 is a pictorial view of the exemplary control panel of FIG. 24 at greater magnification in exemplary can mode and in a disabled unsaturated state;

FIG. 26 is a pictorial view of the exemplary control panel of FIG. 24 at greater magnification in exemplary can mode and in an enabled state;

DETAILED DESCRIPTION OF SPECIFIC EMBODIMENTS

Various embodiments of a software control interface that may be used with general types of computing systems or more particular systems, such as video playback systems are disclosed. One variation includes software that generates an interface that includes multiple control panels that are user scrollable and selectable. The control panels may be arranged as panels on a rotatable object, such as a cylinder or can, as book pages or folds of an accordion. Individual panels may be detached and moved. Additional details will now be described.

Figure 1:
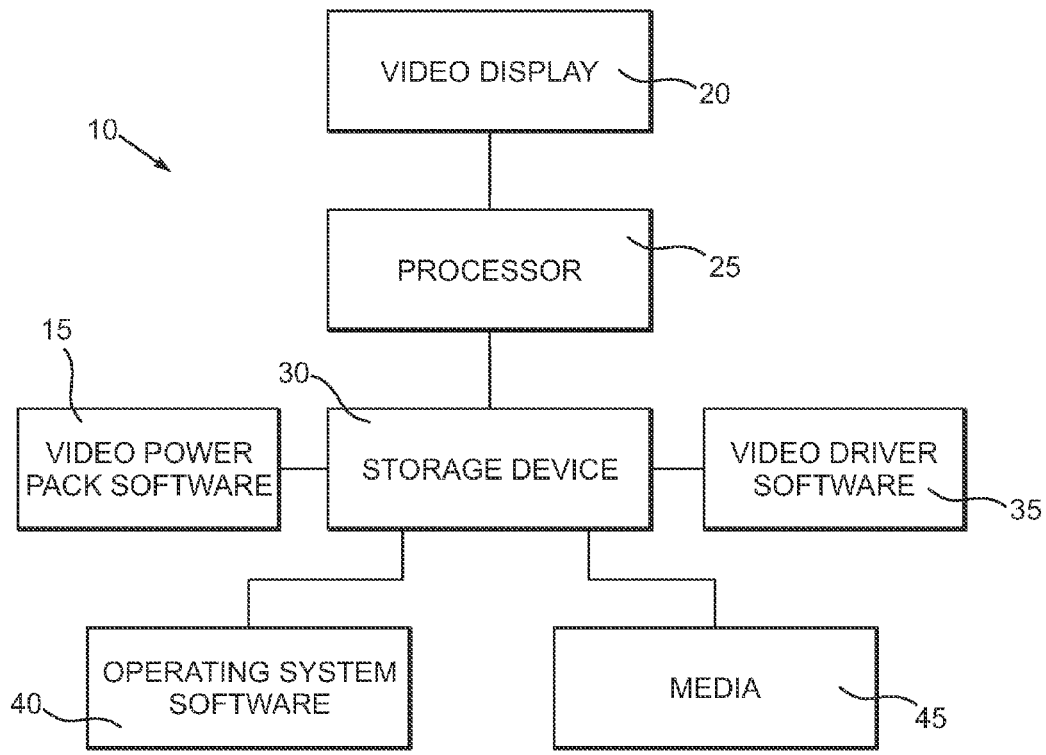
FIG. 1 is a schematic view of an exemplary embodiment of a video playback system that may be used with an exemplary software interface.

In the drawings described below, reference numerals are generally repeated where identical elements appear in more than one figure. Turning now to the drawings, and in particular to FIG. 1 therein is shown a schematic view of an exemplary embodiment of a computer system 10 that may be used with a ring control interface or video power pack (VPP) software 15 that is designed to enable the user to manipulate various aspects of video playback and other features by way of an on-screen interface that will be described in greater detail below. Other examples include video preprocessing for transcoding or encoding for wireless displays, video conferencing or others. The computer system 10 may take on a great variety of configurations and include various features. In this illustrative embodiment, the computer system 10 includes some type of video display 20, a processor 25, at least one storage device 30, the aforementioned VPP software 15, optional video driver software 35, operating system software 40 and some form of media 45.

The video display 20 may take on a great variety of configurations, such as a monitor, an integrated video screen in a computer, handheld device or other device, a television, or the like. The processor 25 may be an integrated circuit dedicated to video processing, a microprocessor, graphics processing unit (GPU), an accelerated processing unit (APU) that combines microprocessor and graphics processor functions, an application specific integrated circuit or other device. An exemplary APU may include fixed function cores for compression, decompression, pre-imposed or post-imposed processing tasks or others. Indeed, the processor 25 may consist of multiple examples of such integrated circuits operating in parallel or otherwise.

The storage device 30 is a computer readable medium and may be any kind of hard disk, optical storage disk, solid state storage device, ROM, RAM or virtually any other system for storing computer readable media. The optional video driver software 35 may be used depending upon the capabilities of the operating system software 40 and the overall capabilities of the processor 25. The VPP software 15 is intended to be platform and operating system neutral. Thus, the operating system software 40 may be virtually any type of software design to facilitate the operation of the processor 25 and a storage device 30. Windows®, Linux, or more application specific types of operating system software may be used or the like. The types of media 45 will be described in conjunction with a subsequent figure. It should be understood that the VPP software 15, the optional video driver software 35 and the operating system 40 may be resident on the storage device 30 or stored in some other location and transferred to the video playback device 10 as necessary by way of some form of network connection or other type of delivery system.

Figure 2:
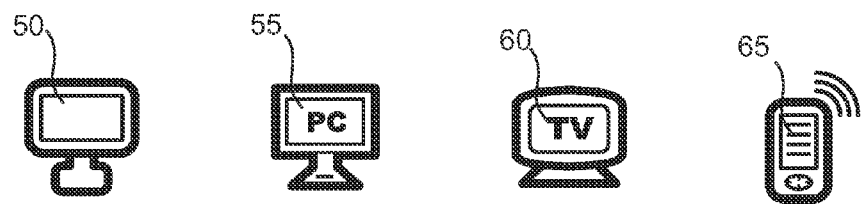
FIG. 2 is a schematic view of various exemplary video playback devices.

FIG. 2 is a schematic representation of a few exemplary types of computer systems 10 capable of displaying video. For example, a video monitor 50, a personal computer 55, a television 60 or a handheld device 65, such as a smart phone, other personal digital assistant or even a remote control with a display, may be used. The external monitor 50 may be connected to some other type of video delivery system, such as an optical disk player, a computer, a set top box or the like. The same is true for the personal computer 55 and the TV 60. It should be understood that various levels of integration may be implemented to combine features. For example, the TV 60 may include an integrated optical disk player, hard drive or the like and even incorporate the VPP software 15 and operating system software 40. In another example, the smart phone 65 may integrate all the features of FIG. 1 in a single enclosure. A computer system 10 could be embodied as a conventional desktop, notebook or server computer system, mobile (e.g., handheld or palm/pad type) computer system, intelligent television, set top box, computer kiosk or any other computing platform. Thus, the terms "computer system" as used herein contemplates various levels of device integration as well as embedded systems or x86-based.

Figure 3:
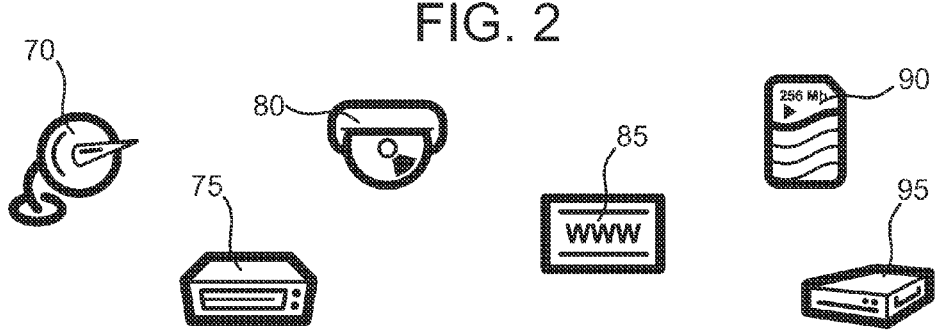
FIG. 3 is a schematic view of some exemplary video media sources.

FIG. 3 depicts schematically some of the types of media anticipated that may be used with the video playback system 10 depicted in FIG. 1. Examples include media supplied by satellite tuner 70, cable set top box 75, optical disk player 80, internet streaming 85, a removable storage device 90 or a hard drive 95. These represent just a few examples of the types of media that may be used to deliver video signals to the video processor and thus the video display depicted in FIG. 1.

Figure 4:
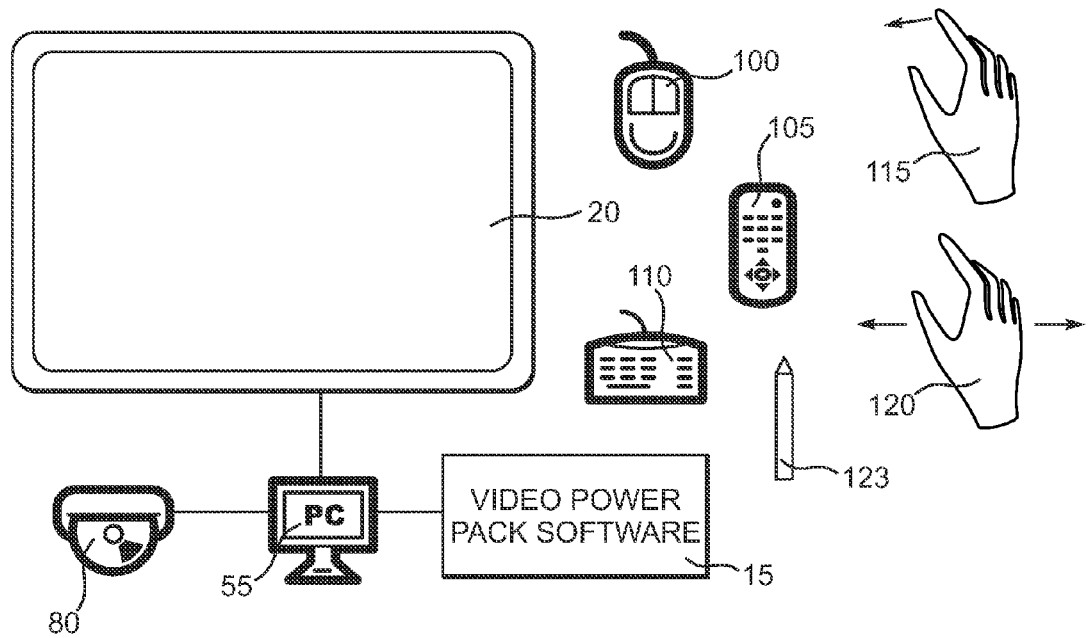
FIG. 4 is a schematic view of an exemplary computing system of video playback as well as a schematic view of a number of exemplary types of user input techniques.
Figure 5:
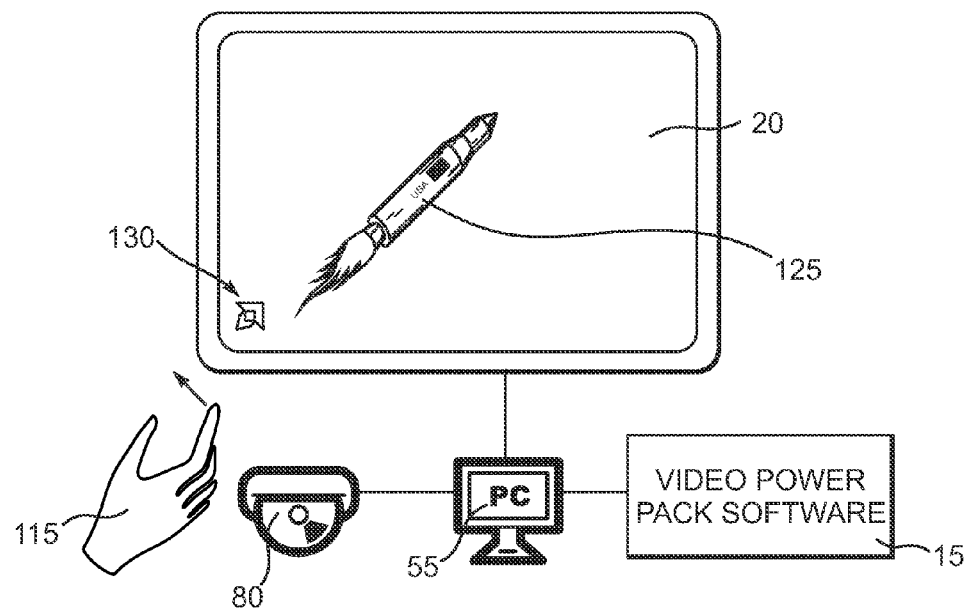
FIG. 5 is a schematic view like FIG. 4 but depicting the initial playing of a video and the launching of a launch icon.

The operation of the VPP software 15 depicted schematically in FIG. 1 will now be described in conjunction with FIGS. 4-21 and initially to FIG. 4. FIG. 4 depicts an example of a video display 20, which in this case is an external video display connected to a personal computer 55 and an optical disk player 80 that provides the requisite video media. The optical disk player 80 is connected to or part of a personal computer 55 that is connected to the display 20. As noted elsewhere herein, however, the various components that ultimately provide the video display can take on a great number of configurations. Assume for the purposes of this illustration that the VPP software 15 is loaded on a computer readable medium in or connected to the computer 55. The VPP software 15 may be provided with the capability to receive user input in a variety of ways. For example, input may be by way of selection devices, such as a mouse 100, a remote control 105, a keyboard 110, human touch 115, human gesture 120, digital pen 123, or other. The human gesture 120 may be performed by hand motion or by way of motion with the remote control 105 or similar device, by eye movement, voice command or other. Of course, user input may be by any combination of the foregoing techniques. Assume for the purposes of the following discussion that the video display 20 is touch enabled so that user input may be by touch 115 and that the optical disk media 80 is activated and video is being displayed on the display 20. This and other figures will use a simple illustration of a rocket 125 at boost phase as an example video.

The VPP software 15 may be launched in a variety of ways. In one example, the VPP software 15 may operate as a background service that launches on system start up. In another option, the VPP software 15 may be manually launched by user selection of a menu or icon. In still another option illustrated in FIG. 5, the VPP software 15 may include an applet that senses when video content is being played and upon playback detection generates an onscreen icon 130. The applet may operate as a background service that launches on system start up. The icon 130 may be selected by the user to launch further aspects of the VPP software 15. A technical goal of the disclosed embodiments is to provide user interfaces that may be manipulated by the user without necessarily obscuring significant portions of the display 20. Accordingly, the VPP software launch icon 130 may be configured to appear near a corner 135 as opposed to the center of the display 20. However, it should be understood that the VPP software 15 may include instructions that launch the icon 130 at virtually any place on the display 20.

Figure 6:
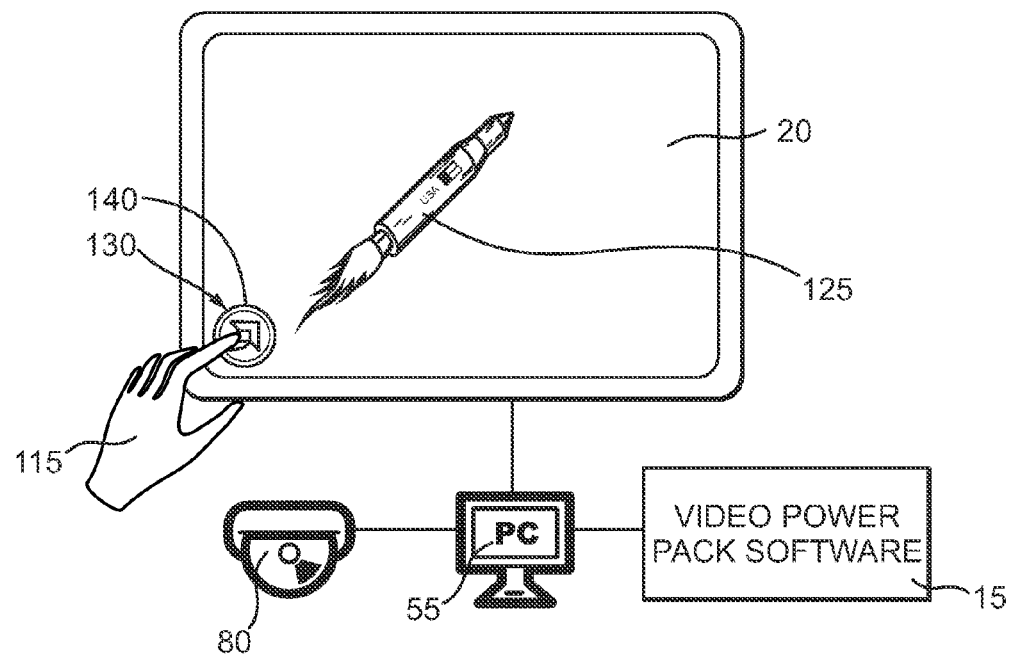
FIG. 6 is a schematic view like FIG. 5 but depicting user selection of the VPP software launch icon.

Referring now to FIG. 6, if the user desires, the user may select the launch icon 130 by touch input 115 to launch the VPP software 15. The VPP software 15 may be configured so that upon selection of the launch icon 130, a change in status such as by way of the depicted halos 140 and/or an audio announcement, may be displayed or played indicating the imminent launch of the VPP software control interface. The latency between the selection of the launch icon 130 and the appearance of the VPP software control interface may be nearly instantaneous or involve some delay of a few seconds depending on the capabilities of the computer 55. Selection of the icon 130 may result in the starting of the VPP software 15 or merely bringing forward the VPP control interface if the VPP software 15 has been operating as a background service.

Figure 7:
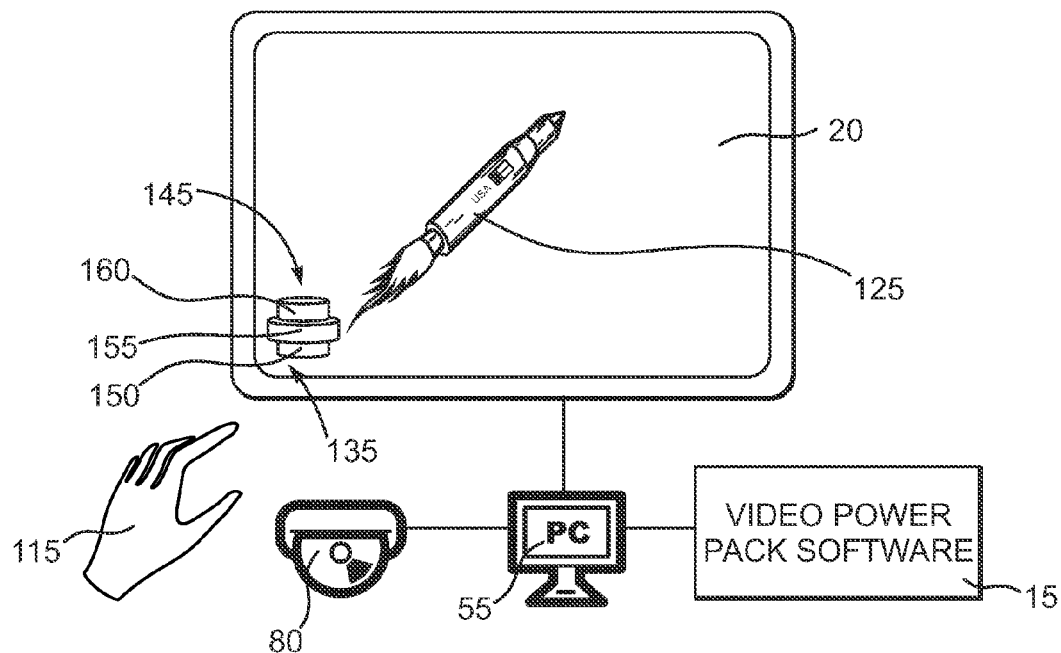
FIG. 7 is a schematic view like FIG. 6 but depicting the display of an exemplary embodiment of a ring control interface.

After the user selects the launch icon 130 depicted in FIG. 6, the VPP control interface 145 of the VPP software 15 appears as shown in FIG. 7. As with the launch icon 130, the VPP control interface 145 may be configured to appear in the corner 135 of the display 20 or at another spot as desired. The nominal configuration for the control interface 145 may be the stacked rings 150, 155 and 160 as shown or some other configuration as described below and may receive user input via touch 115 or other type as described elsewhere herein. The structure and function of the rings 150, 155 and 160 will be described in more detail below. The appearance of the control interface 145 need not alter the playback on the display 20 by the computer 55 and optical disk player 80 of the video of the rocket 125.

Figure 8:
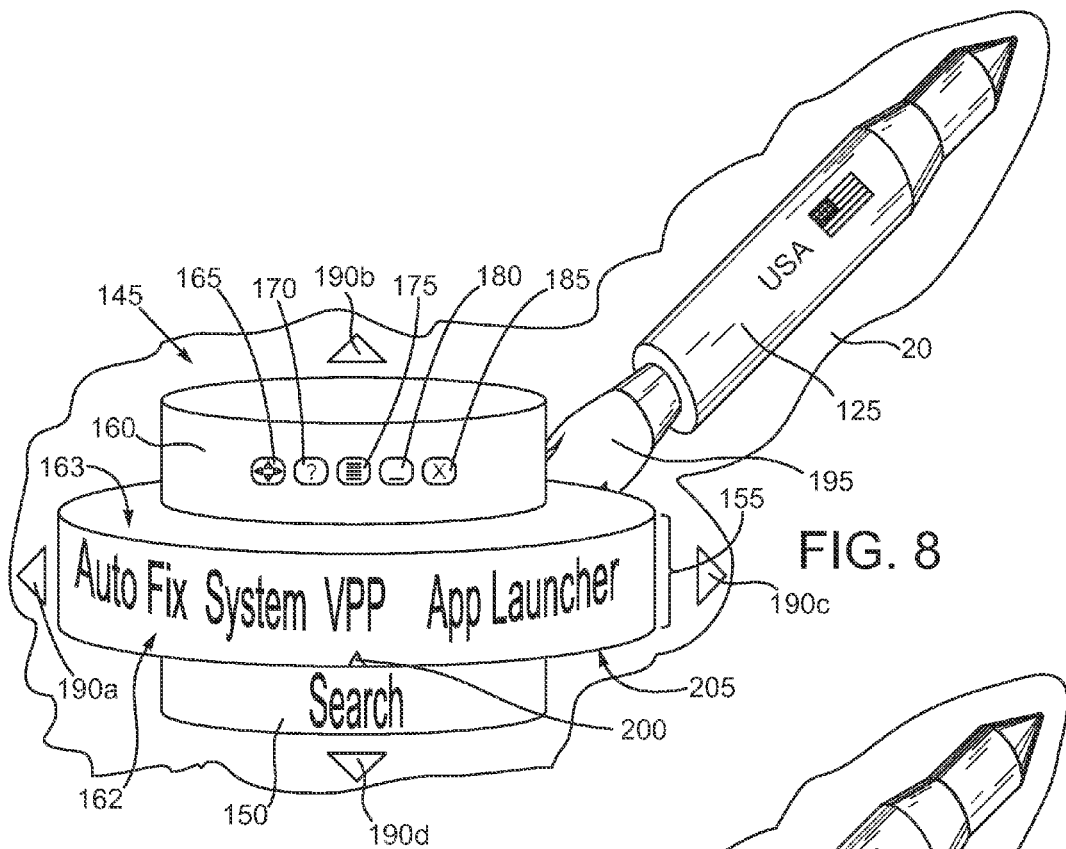
FIG. 8 is a view of the exemplary ring control interface depicted at greater magnification.

Further details of the control interface 145 may be understood by referring now to FIG. 8, which depicts a small portion of the video display 20, the control interface 145 and the video of the rocket 125 at somewhat greater magnification than in FIG. 7. Any or all of the rings 150, 155 and 160 and any other rings disclosed herein may be rendered in 3D as shown. A 3D rendering may not only provide a visual vehicle suitable for lateral scrolling, but also an aesthetically pleasing interface. The rings 150, 155 and 160 may be configured to provide a variety of functions related to user input and delivery of information to the user. In this illustration, the bottom ring 150 may be configured as a search box. If desired, upon initial launch of the control interface 145, the search box of the ring 150 may display some type of instructional text that scrolls around the surface of the ring 150. Thus, the user might be prompted with such scrolling text to type in a search term or take some other action. Additional details of the ring 150 as a search box will be described below in conjunction with other figures.

The ring 155 may be configured as a user scrollable repository for various menu items or icons. As described in more detail below, user selection of one of the depicted menu items AUTO FIX, SYSTEM, VPP and APP LAUNCHER may trigger the presentation of an additional control ring above or below the ring 155, some other type of display panel or even the launch of another software application. The number and types of menu items or icons that can be accessed via the control ring 155 is virtually limitless. Structurally speaking, the ring 155 may be rendered in 3D to appear like a cylinder in perspective. Thus, the ring 155 has an arcuate outer surface 162 that faces toward the user and an oval top surface 163. The arcuate outer surface 162 and the top surface 163 may have various levels of transparency. As described in more detail below, menu items may be scrolled around the arcuate outer surface 162. Any of the rings disclosed herein may have these structural characteristics.

The topmost ring 160 may include various global control icons 165, 170, 175, 180 and 185. A myriad of functions can be served by the global icons. In this illustrative embodiment, the global control icons may consist of a move icon 165, a help icon 170, a settings journal icon 175, a minimize icon 180 and an application close icon 185. User selection of the move icon 165 may cause four arrow glyphs 190a, 190b, 190c and 190d to appear. Selection of any of these glyphs 190a, 190b, 190c and 190d may enable the user to move the control interface 145 to some other location on the display 20. The selection of the help icon 170 can launch a help menu. Selection of the settings journal 175 icon will display the settings journal. The settings journal may store and display a rolling history of various video settings selected by the user. Selection of the minimize icon 180 will, as the name implies, minimize the control interface 145 and selection of the close icon 185 will close the control interface 145 and may as desired, turn off the VPP software 15 depicted in FIG. 1.

Figure 9:
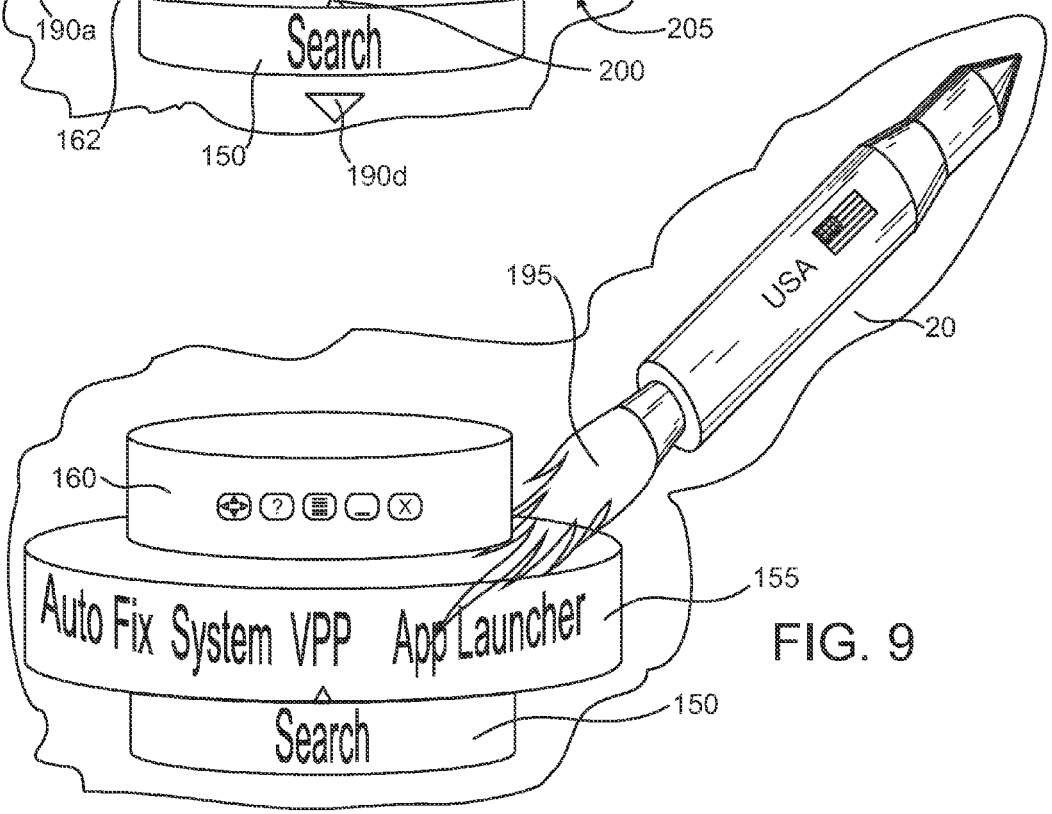
FIG. 9 is a view like FIG. 8 but depicting an alternate exemplary control interface.

It should be understood that the rings 150, 155 and 160, as well as any additional hierarchical rings that may be displayed, may have various levels of opacity. As shown in FIG. 8, the rings 150, 155 and 160 may be opaque and thus obscure, for example, a portion of the tail plume 195, of the rocket 125. However, the skilled artisan will appreciate that the rings 150, 155 and 160 may be less than fully opaque and thus may be for example, have some degree of transparency, all the way up to being fully transparent as is depicted in FIG. 9 where the rings 150 and 155 are transparent and thus do not obscure the tail plume 195. However, some or all of the rings may be left opaque or transparent as desired. Thus, in FIG. 9, the ring 160 may remain opaque. The same is true for any of the other rings 150 and 155. Regardless of the level of opacity, the rings 150, 155 and 160 may be black and white or colored as desired and may each have a different color if desired.

Referring again briefly to FIG. 8, the control ring 155 may be provided with a marker 200 that can provide a visual pop of one form or another to indicate user input focus on the control ring 155. In this illustration, the marker 200 may be a simple triangle, but may also be in virtually any other shape. In addition, user input focus may be indicated by change in other aspects of the control interface 145. For example, the bottom arc 205 of the ring 155 may indicate some sort of visual pop, such as an increased line weight or a change in color in order to indicate input focus shifting to the control ring 155.

Figure 10:
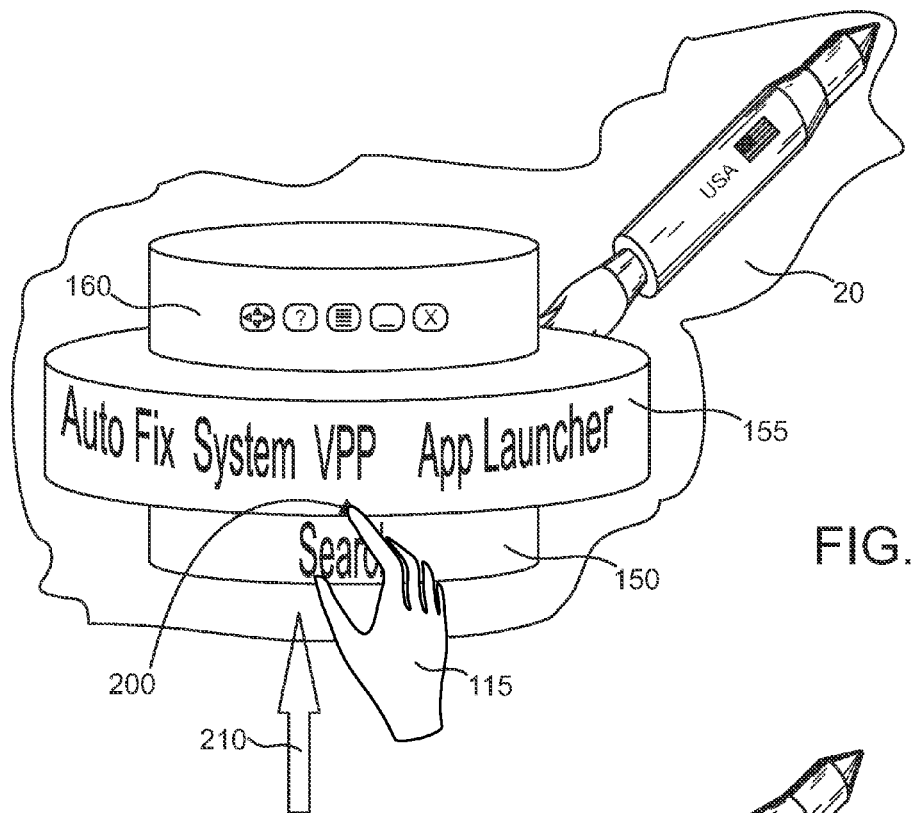
FIG. 10 is a view like FIG. 8 but depicting the user selection of a control ring of the control interface.

Referring now to FIG. 10, user input focus may be shifted to the control ring 155 by, for example, an upward scrolling motion as suggested by the arrow 210 via touch input 115. Note that the marker 200 changes appearance to indicate that user input focus is now on the control ring 155. Note also that changing input focus to the control ring 155 does not necessarily change the states of either the ring 150 or the ring 160. Nor is there any change in the video output on the display 20.

Figure 11:
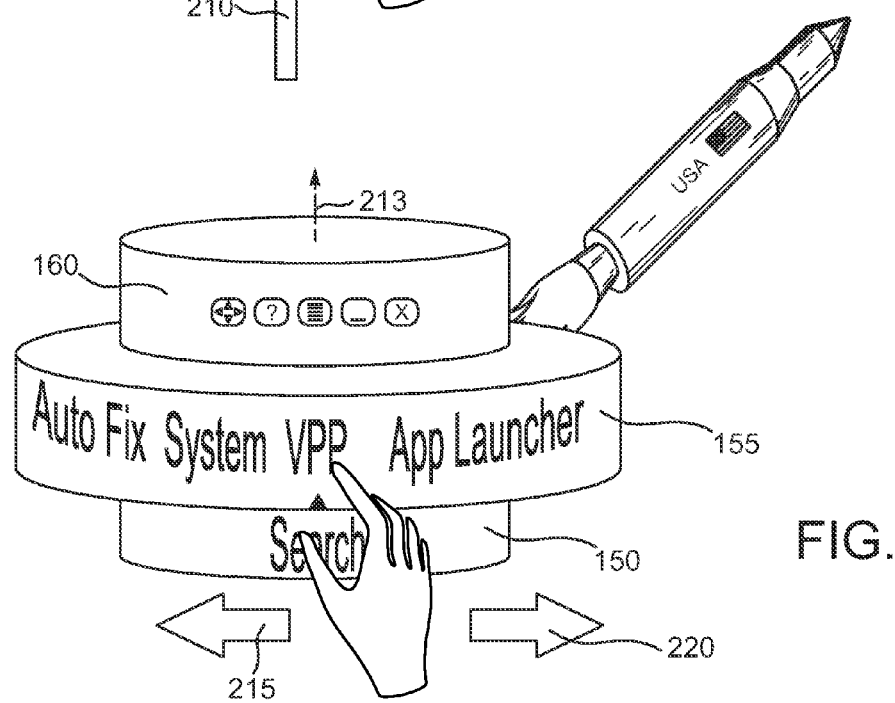
FIG. 11 is a view like FIG. 10 depicting the lateral scrolling of one of the control rings of the control interface.
Figure 12:
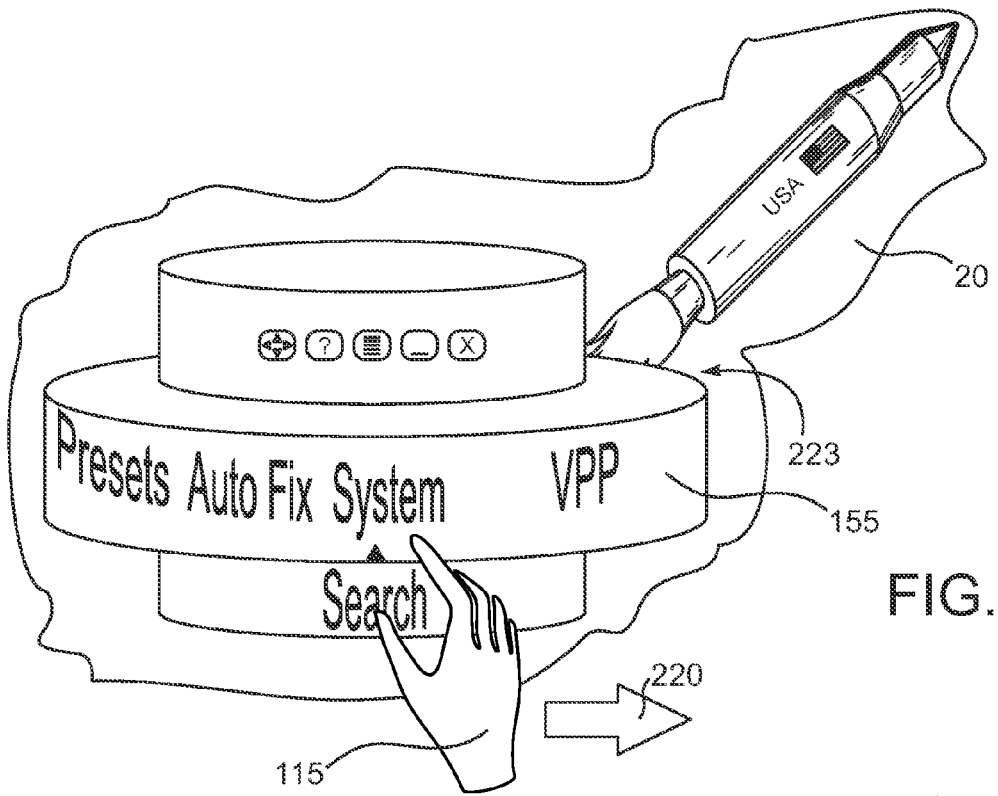
FIG. 12 depicts right-hand scrolling of the control interface.
Figure 13:
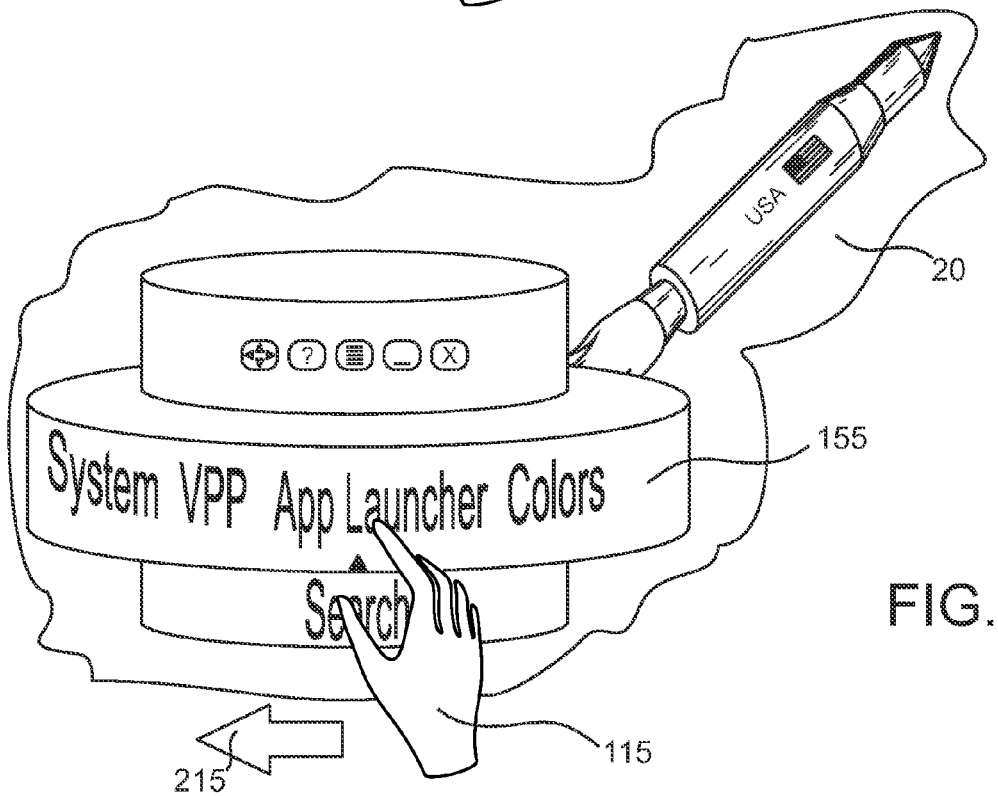
FIG. 13 depicts the results of left-hand scrolling of the control interface.

Referring now to FIG. 11, the control ring 155 has an axis of rotation 213. The axis of rotation 213 may be vertical as shown, horizontal or at some other angular orientation. The axis of rotation 213 may be coincident with the plane of the page or some other plane. The menu of items on the control ring 155 may be scrolled in one direction or the opposite direction around the axis 213 via touch input 115 as suggested by the arrows 215 and 220. However, any type of user input may be used to scroll the control ring 155. The scrolling function will now be described in more detail in conjunction with FIGS. 12 and 13 and again using touch input 115 as an example. Referring to FIG. 12, assume that the user by touch input 115 scrolls the items on the control ring 155 to the right as indicated by the arrow 220. User scrolling rotates the menu items, bringing some into view and sending others out of view. As a result of the right hand scrolling, the item APP LAUNCHER depicted in FIGS. 10 and 11 disappears to the right around the back side 223 of the control ring 155 and the item VPP moves to the right to the position formerly occupied by the item APP LAUNCHER. The menu items AUTO FIX and SYSTEM scroll to the right correspondingly and a previously unseen menu item PRESETS appears from the backside of the control ring 155. The scrolling effect is superficially similar to a Lazy Susan that may be rotated about a central axis to present different household items to a user. However, unlike a Lazy Susan, which has a finite size and thus a finite number of items that may be displayed through one 360° rotation, the control ring 155 has a virtually limitless number of items that may be displayed to the user via lateral scrolling. Thus, for example, while FIGS. 10, 11 and 12 have depicted a total of five menu items accessible on the control ring 155, there may be scores, hundreds or even more of such items dependent upon the number of such items that are desired to be provided to the user. Since large numbers of menu items or icons can be accessed by scrolling the ring 155, a large amount of user options can be accessed in an interface 145 that is relatively compact and unobtrusive.

Figure 14:
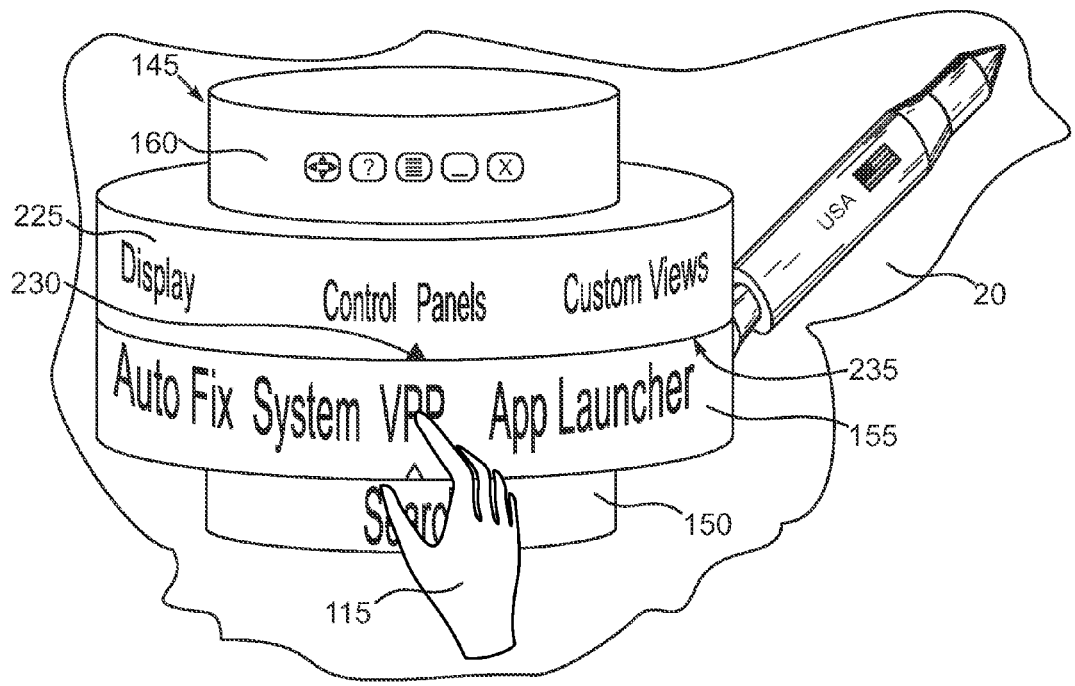
FIG. 14 depicts the selection of an item from a control ring and the generation of another control ring in response.

As shown in FIG. 14, scrolling in the direction of arrow 215 by touch input 115 hides the PRESETS item revealed in FIG. 12 and rotates the item system VPP app launcher to the left and also reveals a previously hidden item COLORS. It should be understood that a given scrollable ring, such as the ring 155, if provided with some level of opacity, includes a structural ring or disk and a set of menu items or icons. User scrolling will typically move the menu items or icons without producing any movement of the structural portion of the ring 155. However, the VPP software 15 (see FIG. 1) may be configured so that the structural portion of a given ring appears to rotate during scrolling. This may be accomplished by appropriate manipulation of shading, shape, opacity or other techniques. Note that the text of the menu items AUTO FIX, SYSTEM, VPP and APP LAUNCHER may be rendered to track the curvature of the control ring 155. Therefore, a given menu item may begin to be rendered in perspective as it is scrolled into or out of view on the ring 155.

The selection of a given item on the control ring 155 will now be described in conjunction with FIGS. 14 and 15. Referring initially to FIG. 14, assume for the purposes of this illustration that the user desires to select the VPP item on the control ring 155. When the VPP item is selected by touch input 115, a VPP control ring 225 appears stacked on top of the control ring 155. The ring 225 may be provided with a marker 230 positioned on the lower arc 235 of the ring 225. The marker 230 may be configured to provide some form of visual pop to indicate user input focus on the ring 225. Indeed as with the other rings, the lower arc 235 may be configured to provide some additional form of visual pop as described elsewhere herein. The control ring 225 may be essentially a sub-menu associated with the VPP item of the control ring 155. In this way, the control ring 155 may function as a menu and the control ring 225 function as one of possibly several sub-menus. Thus, the control ring 225 may include items, such as DISPLAY, CONTROL PANELS and CUSTOM VIEWS as well as a nearly infinite number of other types of items that may be appropriate for the VPP functionality. As with the control ring 155, the control ring 225 may be laterally scrollable by touch input 115 or any other type of user input. The control ring 225 may be configured with the same size, shape and opacity as the control ring 155 or with different characteristics as desired. The content of the control ring 225 will of course depend upon which of the items on the control ring 155 are selected by the user. Thus, if the APP LAUNCHER item is selected, then the items displayed on the control ring 225 may include different types of applications that the user may then select and launch as appropriate. The same is true for the types of items that might be displayed that are appropriate for both the SYSTEM item and AUTO FIX or any of the other items that may be scrolled to on the control ring 155. Note that the launching of the control ring 225 need not change the appearance of the control ring 150 and merely results in the vertical shifting of the control ring 160 to a position on top of the control ring 225. The control interface 145 may be configured so that after a period of user inactivity, a given sub-menu control ring, such as the control ring 225, may collapse from the state depicted in FIG. 14 and thus disappear leaving the control interface 145 in the state depicted in, for example, FIG. 10. This auto minimize or close period is subject to great variety, may be some period of one to several seconds.

Figure 15:
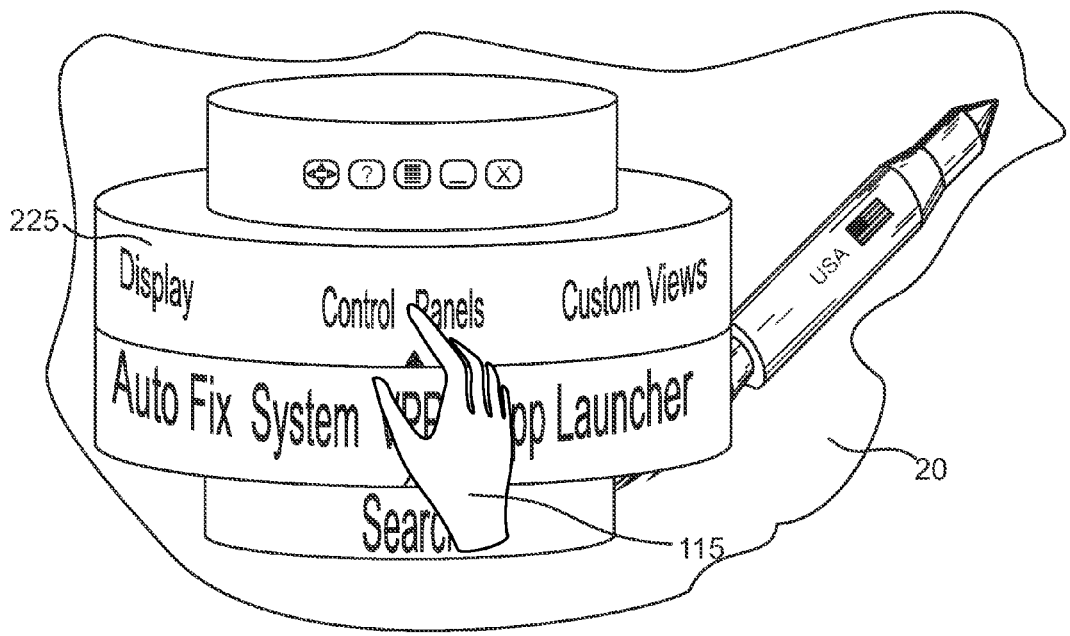
FIG. 15 is a view like FIG. 14 depicting the selection of an item from the additionally generated control ring.
Figure 16:
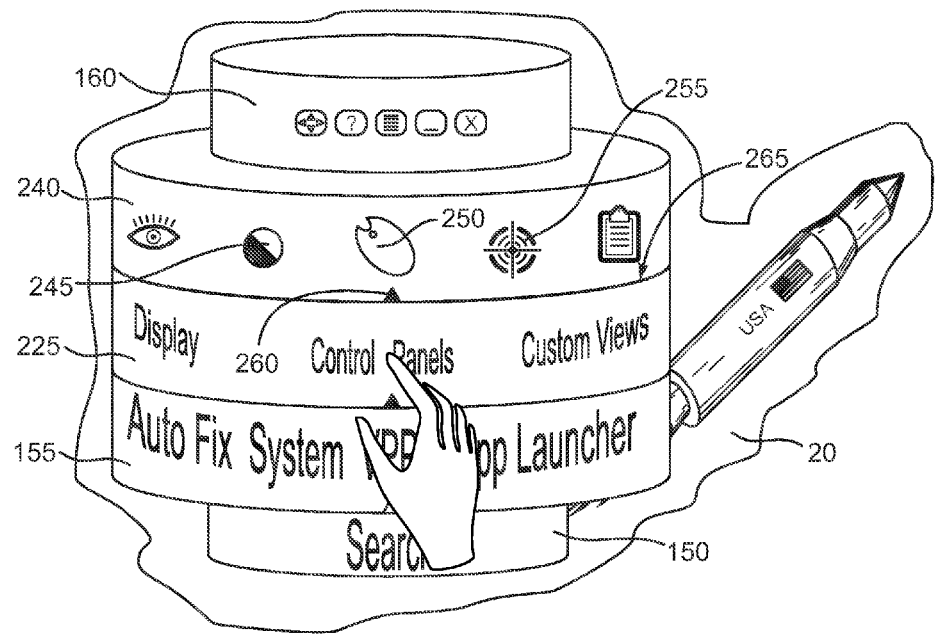
FIG. 16 depicts another control ring generated as a result of the selection in FIG. 15.

Assume for the purposes of this illustration that the CONTROL PANELS item on the control ring 225 is selected via touch input 115 as shown in FIG. 15. Upon selection of the CONTROL PANELS item on the control ring 225, another control ring 240 appears above the control ring 225 as shown in FIG. 16. The control ring 240 functions as a scrollable sub-menu for the control ring 225 and in particular the CONTROL PANELS item of the control ring 225. Thus, the control ring 240 may include a set of icons that may be virtually limitless in number, scrollable and selectable like the items on the control rings 225 and 155. A few examples of these icons are in view and may be, for example, dynamic contrast 245, color adjustment 250, de-noise 255 and a couple of others that are not separately labeled. Optionally, in lieu of icons, text items such as those used for the rings 155 and 225 may be used. Indeed, any of the rings disclosed herein could be based on icons, text or some combination thereof. The control panels of the ring 240 may be used to adjust various aspects of the video display 20. As with the control ring 225, the control ring 240 may be configured to collapse and disappear after some period of inactivity by the user. Similarly, as with the control ring 225, the ring 240 may be provided with a marker 260 positioned on the lower arc 265 of the ring 240 and the marker 260 may be configured to provide some form of visual pop to indicate user input focus on the ring 240. Indeed as with the other rings, the lower arc 265 may be configured to provide some additional form of visual pop as described elsewhere herein.

Figure 18:
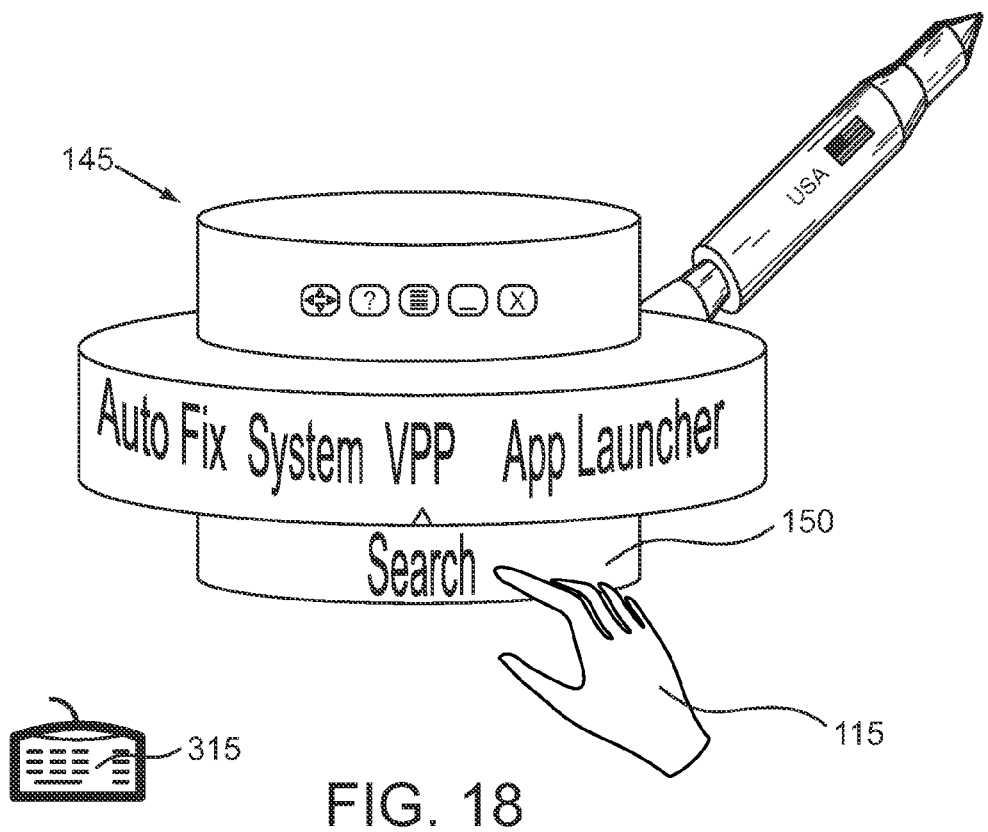
FIG. 18 is a view like FIG. 8 but depicting the user selection of a control ring configured as a search box.

Assume for the purposes of this illustration, that the color adjustment icon 250 is selected by the user as indicated in FIG. 18. Upon touch input 115 on the color adjustment icon 250, a color adjustments control panel 270 is presented on the video display 20. Here, the color adjustments control panel 270 appears immediately to the right of the control interface 145. However, the control interface 145 may be configured so that a given opened control panel appears virtually anywhere on the display 20 in relation to the control interface 145. The color adjustments control panel 270 may take on a huge variety of different configurations. Here, the color adjustments control panel 270 may include a tint wheel 275 that may be user adjustable by way of a peripherally movable slider 280 by way of touch input 115. In addition, a saturation slider 285, a brightness slider 290 and a contrast slider 295 may be provided. The sliders 285, 290 and 295 may also be provided with a numerical indicator 300, 305 and 310. The ranges for the numerical indicator 300, 305 and 310 may be tailored according to user needs. The exact composition of a given control panel, such as the control panel 270, may take on a great variety of configurations. Thus, if the user selects the dynamic contrast control panel icon 245 instead of the color adjustments control panel 270, then a control panel with appropriate functionality for dynamic contrast adjustment would be displayed instead of the color adjustments control panel 270 and so on. A given open control panel, such as the control panel 270, may automatically minimize or otherwise disappear after some period of user inactivity. If the user desires to manually close the color adjustments control panel 270 then a close icon 315 may be selected. Like the control rings 150, 155, 160, 225 and 240, a control panel may be provided with various levels of opacity so that underlying portions of the video display 20 may still be visible during manipulation of the control panel 270.

Figure 19:
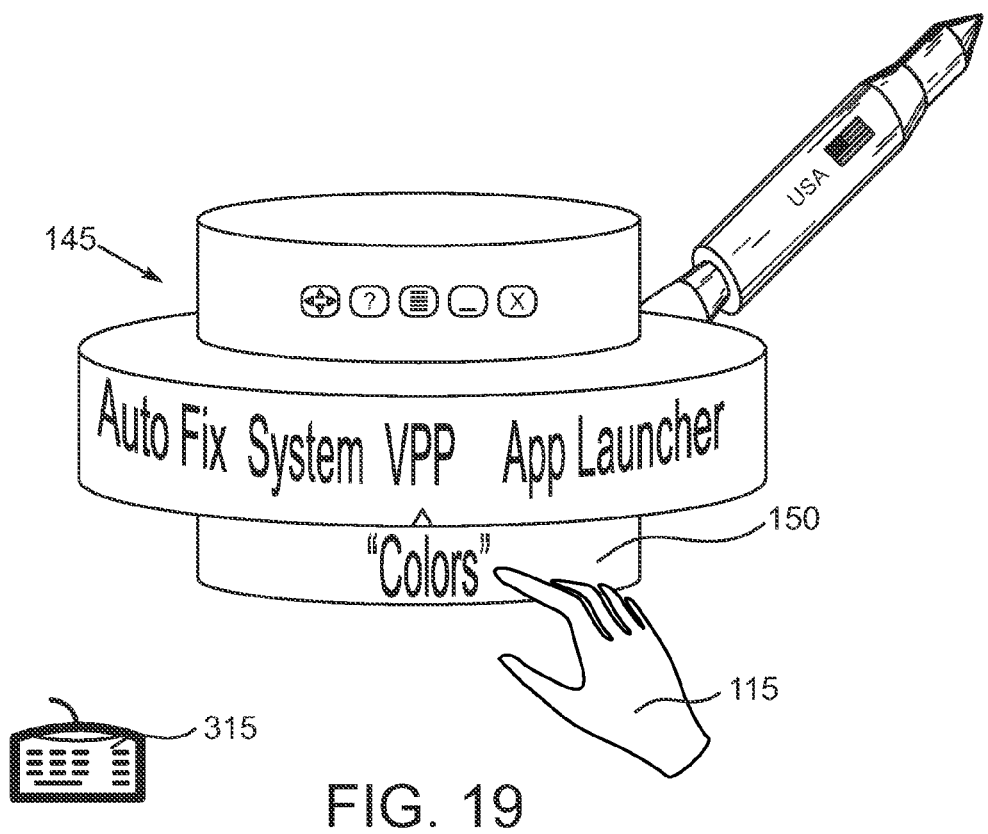
FIG. 19 is a view like FIG. 18 depicting user input of a search string.

Additional details of the search functionality of the control interface 145 will now be described in conjunction with FIGS. 18 and 19. Referring first to FIG. 18 and assuming for the purposes of this illustration that touch input 115 is used, the user may select anywhere within the control ring 150. At this point, the user may input a textual search string. This may be accomplished in a number of ways depending upon the types of user input schemes available. For example, and assuming that touch input is enabled, selection of the control ring 150 may produce a pop-up touch enabled key pad 315 that may be typed on by the user and produce a search string within the control ring 150. The skilled artisan will appreciate, however, that other mechanisms for inputting text such as a physical keyboard, a mouse input via a digital keyboard, remote controller or virtually any other text input device may be used. Referring now to FIG. 19, assume for the purposes of this illustration that by touch input 115 or other input on the key pad 315, the search term "colors" is entered into the control ring 150. The search ring 150 may be configured so that the control interface 145 interprets the search string in real time and attempts to make predictive guesses as to the item searched for by the user. In another option, the entire search string may be input by the user and then the equivalent of a hard return or other select action may be generated and at that point the search performed. Regardless of whether the control interface 145 executes a predictive or a manual search, if the search term matches some or all of a given feature within any of the menus, sub-menus, rings, etc. of the control interface 145 then the search results will be displayed. If desired, the control interface 145 may be configured to automatically open an exactly matching item, such as the color adjustments control panel 270 depicted in FIG. 17, in the event of an exact match. Otherwise, the user may simply be presented with a list of potential matches and the option to select one or more those by user input.

Figure 20:
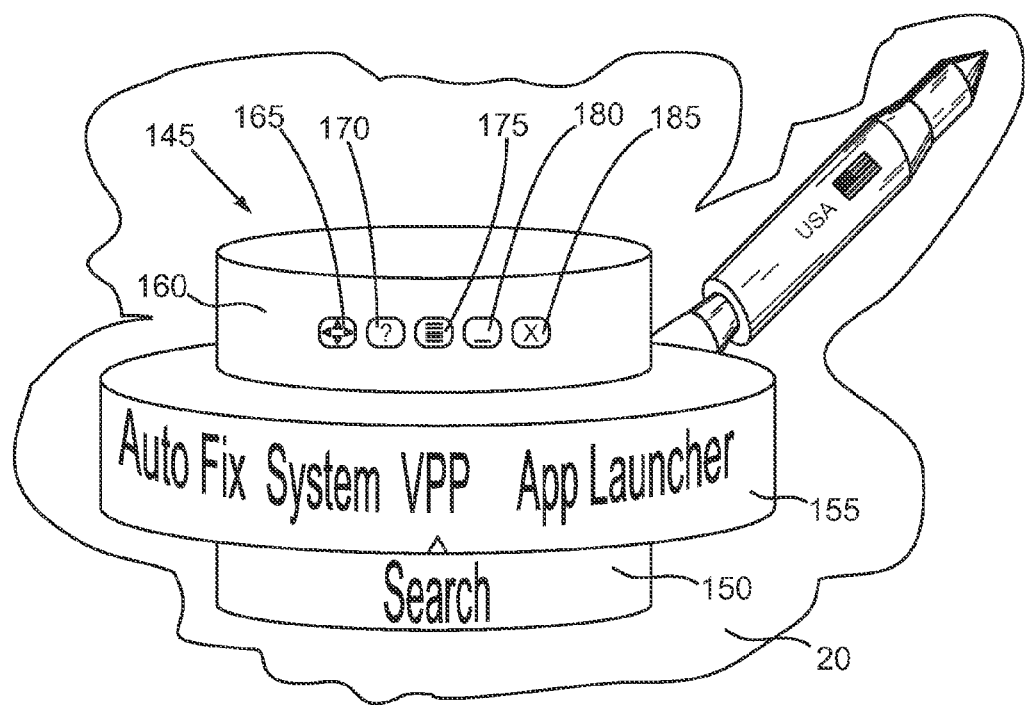
FIG. 20 is a view like FIG. 18 but depicting in more detail the function of various icons on a control ring.
Figure 21:
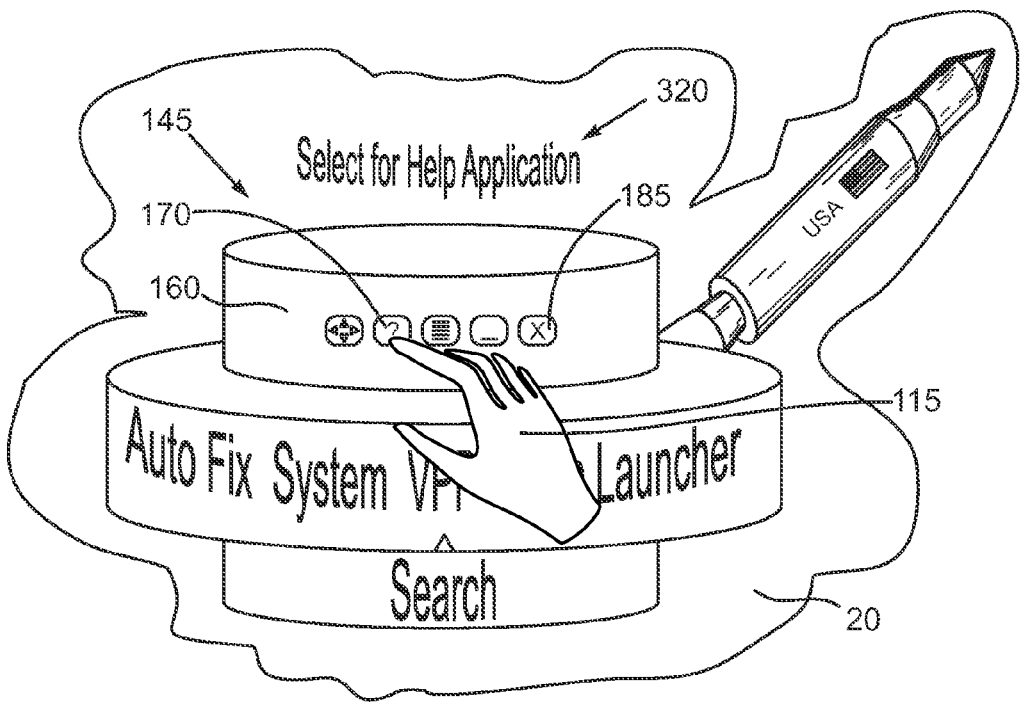
FIG. 21 is a view like FIG. 20 but depicting user selection of one of the icons.

A few additional details regarding the control ring 160 of the control interface 145 will now be described in conjunction with FIGS. 20 and 21. FIG. 20 depicts the control interface 145 at the initial launch point where the control rings 150, 155 and 160 are visible on the display 20. As noted above, the control ring 160 may be provided with a default configuration of global icons 165, 170, 175, 180 and 185 in the positions depicted in FIG. 20. However, as noted elsewhere, the number, positioning and arrangement of the icons 165, 170, 175, 180 and 185 may be tailored as desired. Indeed, if the number of icons 165, 170, 175, 180 and 185 needs to be greater than five or otherwise greater than the available visual space on the ring 160 then the icons 165, 170, 175, 180 and 185 may be made laterally scrollable and thus be of almost infinite number as with the items on the control ring 155. Assume for the purposes of illustration that the user selects the help icon 170 as shown in FIG. 21. At this point, the control interface 145 may present the user with a message 320 providing some useful information, such as the name or other functionality of the selected icon. Here, the message 320 is positioned on the display 20 in space above the controller in 160 and may provide some additional visual pop for the user such as by way of a change in color or line weight or other visual indicator to grab the user's attention. The type of message 320 will be dependent upon the particular icon selected thus, if the close icon 185 were hovered over by the user then an appropriate message indicating that selection would close the control interface 145 would be presented. The message 20 may be configured to dwell in space above the ring 160 for some period of time and ultimately collapse, fade out or otherwise disappear in the event of no user input.

Figure 22:
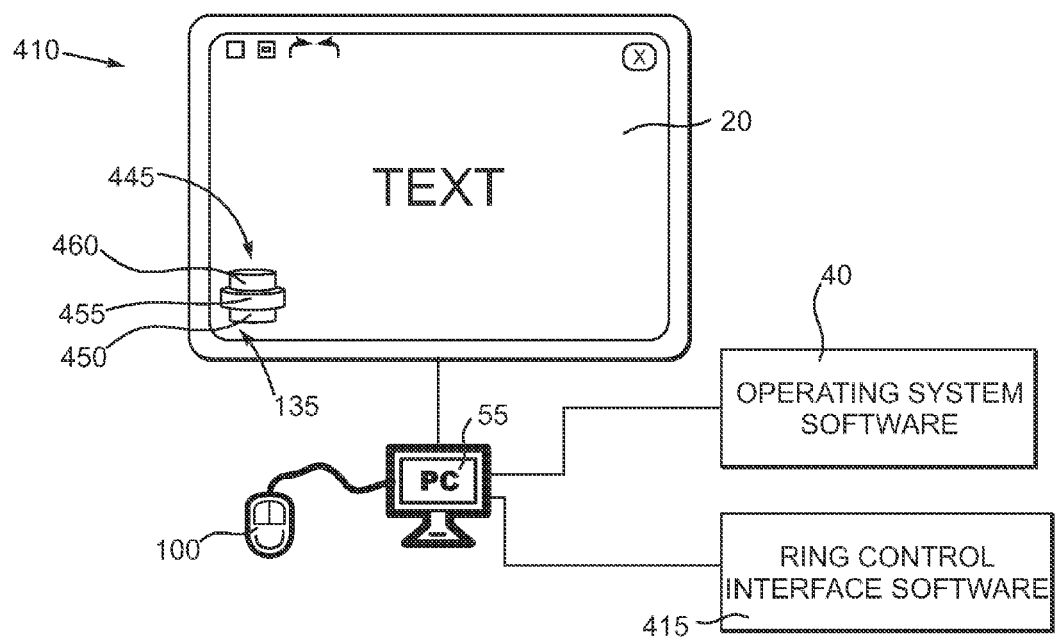
FIG. 22 is a schematic view of a generalized computing system that may be used with ring control interface software to enable user control of various aspects of an exemplary software program.

The foregoing illustrative embodiments provide a scrollable ring interface for controlling various aspects of a computer system. However, as noted above, the concepts of a ring interface may be used in a more generalized computing system. FIG. 22 is a schematic view of a more generalized computing system 410 that includes a computing device, in this illustration a computer 55, ring control software 415 that may be stored in a computer readable medium in the computer 55 or at another storage device as desired. The computer 55 includes a user input device, in this illustration a mouse 100. However, as with the other disclosed embodiments, the types of computing devices and user input devices may be varied greatly. Here, a display 20 is connected to the computer 55. In this illustrative embodiment, the ring control interface software 415 may be configured with a variety of similarities to the VPP software 15 described elsewhere herein. However, the instruction set and API for the ring control interface software 415 may be tailored to provide a ring control interface 445 that may enable user manipulation of various types of software usable on the computer 55. In this simple illustration, the computer 55 is running a simple word processor with some text displayed on the display 20. The control interface 445 may include rings 450, 455 and 460 that may function in various ways similarly to the control interface 145 described elsewhere herein. Here the ring control interface software 415 may be used as an add on application with appropriate APIs to interface with the word processor. Optionally, the word processor itself may directly include code for the ring control interface 445 and its associated functionality. In still another option, the ring control software may be incorporated into or include suitable code and an API to enable user manipulation of aspects of the operating system 40.

Figure 23:
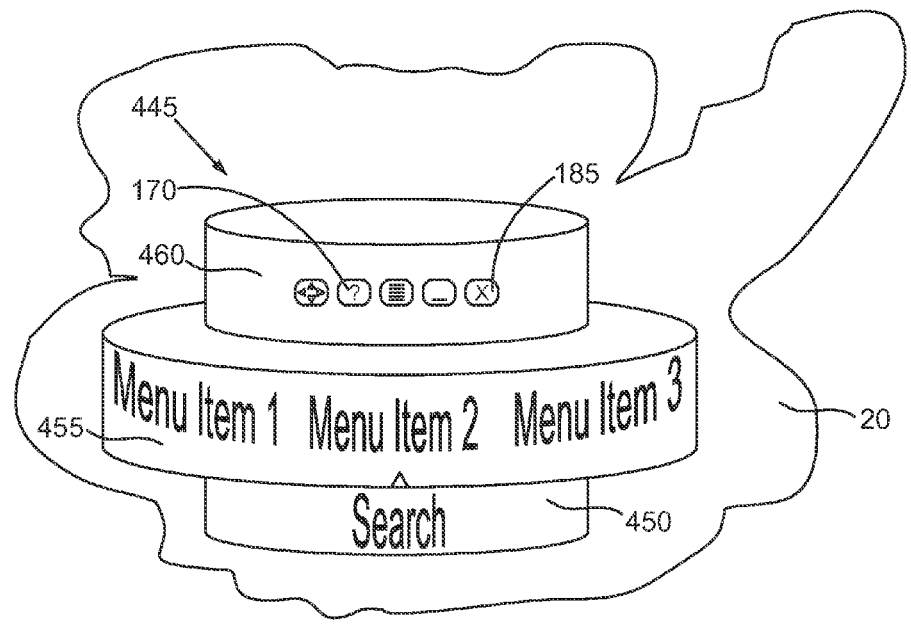
FIG. 23 is a view of the ring control interface shown at greater magnification.

Additional details of the ring control interface 445 may be understood by referring now to FIG. 23, which shows the control interface 445 and a small portion of the display 20 at greater magnification. The ring 450 may be configured as a search ring as described elsewhere. The control ring 455 may be configured as a scrollable ring as described generally above with regard to the control ring 155. However, here a few exemplary generic menu items, MENU ITEM 1, MENU ITEM 2, and MENU ITEM 3 are displayed. These menu items may be virtually any type of menu item that is user selectable. Selection of any one of them may produce an additional control ring, such as the control ring 225 depicted in FIG. 14, albeit with whatever functionality and additional sub-menu items or icons that may be appropriate for menu ITEM 2 for example. For example, in the word processor context, menu ITEM 2 may be a print menu and selection thereof may produce an additional control ring with a variety of printing options. The control ring 460 may be configured with the global icons 175, 185, etc. as generally described elsewhere herein. As with the other disclosed embodiments, the rings 450 and 460 are optional.

Figure 17:
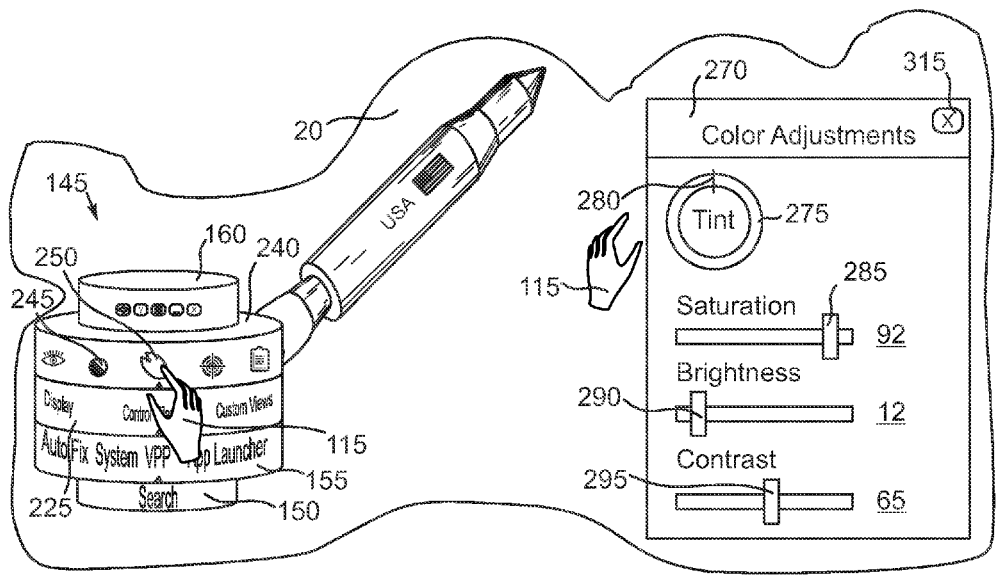
FIG. 17 depicts the control interface along side a control panel generated as a result of the selection of one of the items on the ring depicted in FIG. 16.
Figure 24:
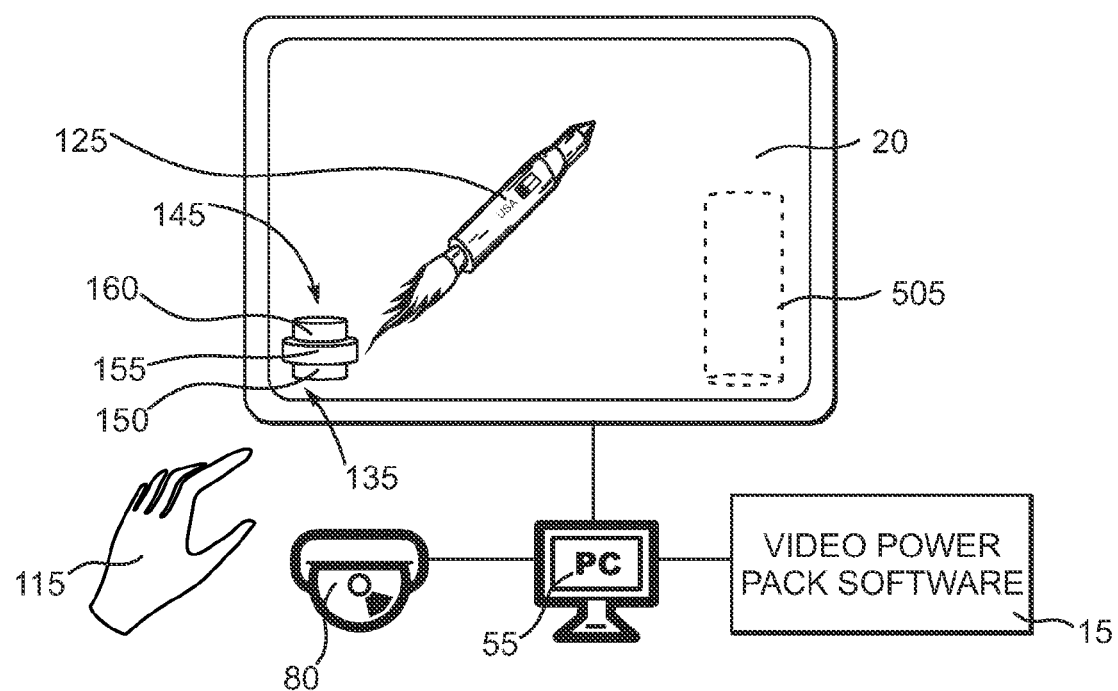
FIG. 24 is a schematic view of the system components depicted generally in FIG. 7 along with a visible exemplary software control panel.

Details of control panel arrangement and management will now be described. Attention is turned briefly again to FIG. 17. The exemplary color adjustments control panel 270 shown in FIG. 17 is a 2D rendering that may appear automatically in full saturation mode upon selection of the relevant control panel icon 250. However, increasing levels of sophistication may be applied to both the rendering, such as in 3D, and aggregation of multiple control panels by instructions in the VPP software 15 (FIG. 1). As described more fully below, multiple control panels may be enabled by the user to provide a variety of filters to video signals as well as various other display and system control inputs. A variety of embodiments incorporating more complex control panel design and arrangements will be described in conjunction with FIGS. 24-36 and initially to reference to FIG. 24. FIG. 24 is a schematic view of the system components depicted generally in FIG. 7. Here, an exemplary video of the rocket 125 is again playing on the video display 20. The video signals are being generated by the combination of the optical disk player 80 and the computer 55. The VPP software 15 is operating in conjunction with the computer 55 and at this point, the control interface 145, which includes the default rings 150, 155 and 160, is open on the display 20. Again, for the purposes of this illustration, touch input 115 will be used to demonstrate the various user inputs. However, the skilled artisan will appreciate that any of the types of selection devices or user input may be implemented as well. Assume for the purposes of this illustration that by way of touch input 115, the user has selected a particular control panel using the ring interface 145 as described generally elsewhere herein. Here, the control panel 505 appears on the display 20 in an unsaturated or disabled state as suggested by the dashed outline. It may be advantageous for the VPP software 115 to bring up a given control panel in an initially disabled state to conserve resources of the computer 55. A large number of enabled control panels might overwhelm the resources of the computer 55. However, if the computer 55 has abundant resources, then any of the control panels including the control panel 505 and others to be described below may be configured to initially appear in an enabled and thus saturated state. The control panel 505 in the unsaturated or disabled state is shown at greater magnification in FIG. 25. Again, dashed lines are used to represent this unsaturated state. However, in practice, the unsaturated state may be represented by a lowered level of opacity, a change in color or some other visual indicator suggesting to the user that the control panel 505 is in a disabled state. The user may place the control panel 505 into an enabled state by selecting some portion. In this illustrative embodiment, the user may select the "Color Adjustments" text near the top of the control panel 505, which places the control panel 505 into an enabled state and into full saturation as shown in FIG. 26. At this point, the word "Enabled" appears next to the title of the control panel 505.

The control panel 505 and any of the other control panels described herein may be presented in a variety of modes. In FIG. 26, the control panel 505 is in can mode. In can mode, as the name implies, the control panel 505 may be presented as a 3D rendering of an object that has a generally cylindrical shape as shown. The control panel 505 may be toggled or otherwise rotated around an axis or rotation 510 by selecting the left-hand or right-hand glyphs 515 and 520. It should be understood that the axis of rotation 510 may be other than vertical and even be non-parallel with the plane of the display. Thus, the glyphs 515 and 520 may be other than right-hand or left-hand. If one or other of the glyphs 515 or 520 is selected then the control panel 505 rotates out of view and another control panel either currently enabled or one that has been previously enabled and thereafter disabled may be revealed. A given control panel may be provided with a set of header icons 525, 530, 535, 540, 545 and 550. In this illustrative embodiment, the header icon 525 may be a move icon that when selected will enable the user to move the control panel 505 to some other location on the display shown in FIG. 24. The header icon 530 may be a help menu. The control panel header icon 535 may be a mode toggling icon that toggles the display of the control panel 505 from, for example, the can mode shown in FIG. 26 to book mode or accordion modes and back as described in more detail below. The control panel header icon 540 may enable the user to remove the control panel 505 from some aggregation of other control panels. The control panel header icon 545 may be a minimize control panel icon and the control panel header icon 550 may be a close icon to enable the user to close the control panel 505 completely. The number arrangement appearance and functionality of the control panel header icons 525, 530, 535, 540, 545 and 550 may be subject to great variation and tailored as desired.

The other end of the control panel 505 may be provided with a set of footer menu items or icons if desired. These footer menu items may be rendered to wrap around the curvature of the control panel 505 as shown or be presented in a more flat arrangement as desired. Here, the footer icons include Undo, Reset, Detach and Remove menu items. Selecting Undo will, as the name implies, undo the last input to the control panel 505, selecting Reset will reset the control panel 505 to some nominal configuration of settings, selecting Detach will perform the same function as for example the detach icon 540 and the selecting the Remove entry will close the control panel 505. As with the control panel header icons 525, 530, 535, 540, 545 and 550, the control panel footer icons Undo, Reset, Detach or Remove may be other than those functionalities depicted and may be assembled in different types of arrangements.

The composition of any given control panel may be varied to provide a desired of user input or system information to the user. The control panel 505 shown in FIG. 26 is a color adjustments control panel that enables the user to provide certain adjustments to the color scheme. Accordingly, a user-scrollable tint wheel 555 and individual red R, green G, and blue G user-selectable values may also be provided. In addition, sliders 560, 565 and 570 may be provided for saturation brightness and contrast adjustment. These sliders may be also provided with numerical indicators of the sliders position as shown. The control panel 505 may be provided with a visual depiction of a wave form monitor 575 as well as a vector scope 580. The visualization of the wave form monitor 575 and the vector scope 580 may be enabled and disabled by selecting the check boxes 585 and 590. In lieu of check boxes, radio buttons or virtually any other type of graphical user selection technique may be used. The wave form monitor simply 575 provides a visualization of some amplitude value versus time and the vector scope 580 shows the color phase and color amplitude of pixels, either as U and V or Cr and Cb visualizations of playing content. Such depictions amount to re-rendering a temporal, spatial, and color sub-sampling of pixels. If the user chooses to disable but otherwise leave visible the control panel 505 then the Enabled label may be selected by touch input 115 to return the control panel 505 to the unsaturated state depicted in FIG. 25. Upon return to the unsaturated state depicted in FIG. 25, the control panel will retain the settings state just prior to disablement.

Figures 27, 28:
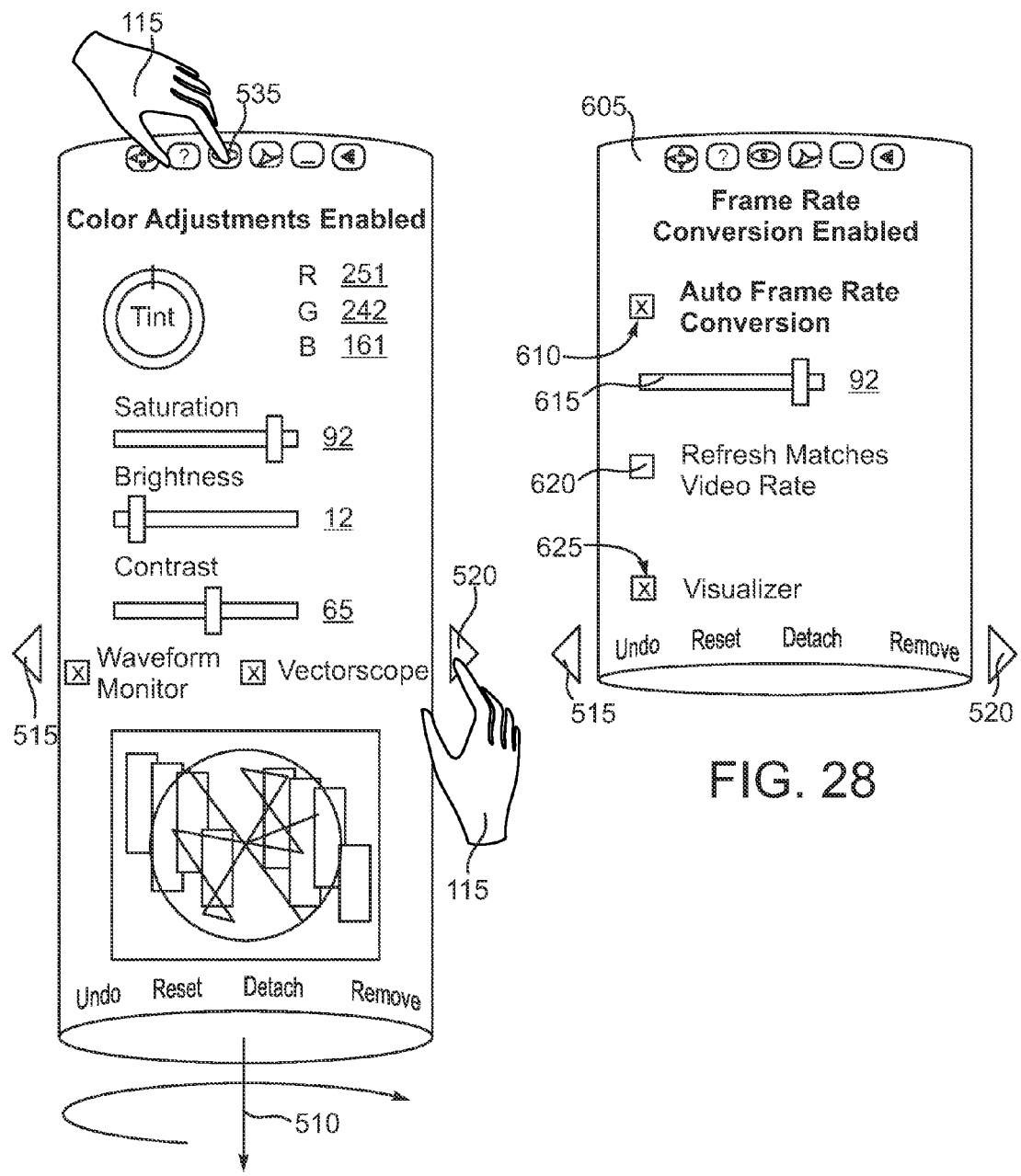
FIG. 27 is a pictorial view like FIG. 26, but depicting exemplary scrolling of the exemplary control panel in exemplary can mode.
FIG. 28 is a pictorial depicting another exemplary control panel scrolled into view in exemplary can mode.

Scrolling of the control panel 505 will be described now in conjunction with FIGS. 27 and 28. To toggle the control panel 505 depicted in FIG. 27 out of view and bring another control panel into view, the user by touch input 115 selects one or the other of the glyphs 515 and 520. In this example, the glyph 520 is selected, which rotates the control panel 505 out of view and reveals another control panel 605 as shown in FIG. 28. This control panel 605 may implement any desired functionality. In this illustrative embodiment, the newly displayed control panel 605 is for frame rate conversion and appears initially in an enabled state. However, if the control panel 605 were not previously enabled by the user then the control panel 605 would appear initially in an unsaturated state, such as for the control panel 505 depicted in FIG. 25, and thereafter the user could enable the control panel 605 by appropriate selection of some portion of the control panel 605 as described in conjunction with FIGS. 25 and 26. Like the control panel 505 depicted in FIGS. 25 and 26, the control panel 28 may include the same control header icons 525, 530, 535, 540, 545 and 550 and the same footer icons Undo, Reset, Detach and Remove. The toggling glyphs 515 and 520 remain in view to enable the user to again toggle from the control panel 605 to another control panel as desired. The control panels 505 and 605 depicted in FIGS. 27 and 28 may be configured so that after some period of user inactivity, the control panel header icons 525, 530, 535, 540, 545 and 550 and the footer menu items Undo, Reset, Detach and Remove may collapse so that the panels 505 and 605 take up less room. For frame rate conversion, the control panel 605 may include a variety of user selectable items, such as a check box 610 to select an automatic frame rate conversion, a slider 615 to enable the user to manually select some frame rate conversion, a check box 620 to compel refresh to match video rate as well as a check box 620 to turn on and off a visualizer. The visualizer for frame rate conversion may provide some sort of visual indication of the effects or artifacts that might be created by frame rate conversion. Again, the exact layout of a given control panel, such as control panels 505 and 605, will depend upon the overall functionality of a given control panel as well as other design discretion considerations. It should be understood that the user could continue to select the glyphs 515 or 520 and toggle in and out of view as many control panels as happen to be aggregated at that moment, whether in a saturated or unsaturated state for any or all of them. It should also be understood that any opened control panel of any of the disclosed embodiments could also be accessed by navigating the control interface 145 depicted in FIG. 24.

Figure 29:
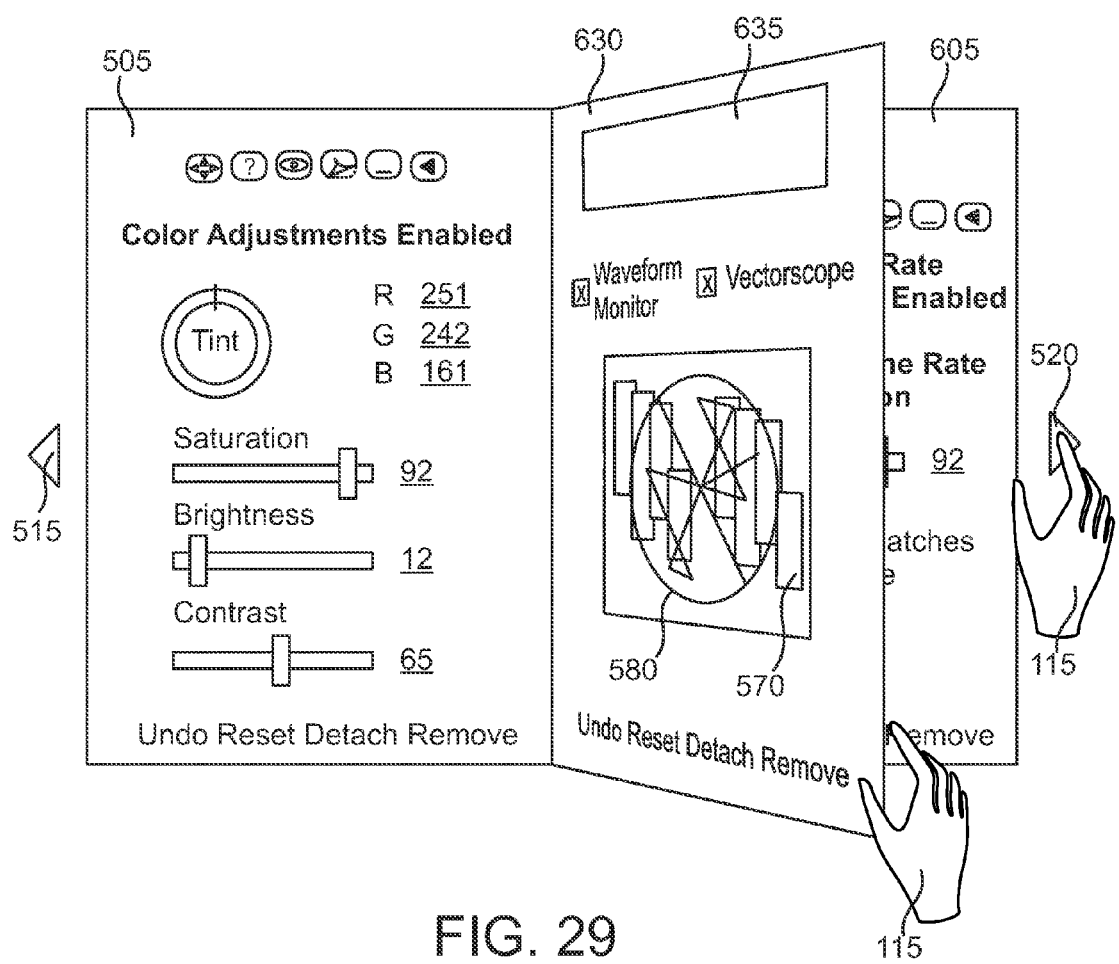
FIG. 29 is a pictorial view of a few exemplary control panels in exemplary book mode.

FIGS. 24, 25, 26, 27 and 28 illustrate the control panels 505 and 605 in can mode. However, the user by touch input 115 may select another mode to either display or enable a toggling of multiple control panels. Thus, by touch input on the mode icon 535 in FIG. 27, the mode may be switched to book mode as shown in FIG. 29. When book mode is enabled as shown in FIG. 29, the previously displayed control panel 505 may appear to the user as a front-facing page and a control panel 630 as a succeeding page. To cut down on the vertical size of the control panel pages, the functionality of a control panel may be split between adjacent pages or panels. Thus the wave form monitor 585, vector scope 590, as well as the wave form monitor 575, vector scope 580 and their respective check boxes 585 and 590 may be presented on facing page or panel 630 relative to the control panel 505 as shown. Some of the types of information that may be displayed via the waveform monitor 570 and even an optional histogram 635 for any of the disclosed embodiments include luminance, R, G or B values either singly or as a group, or other types of information.

Each of the panels 505, 605 and 630 may be provided with a separate set of footer menu items Undo, Reset, Detach and Remove. The page 630 may be flipped to bring the next control panel 605 previously shown in can mode in FIG. 28. The scrolling of pages may be by way of the glyphs 515 and 520 or by selection of a given page and turning thereof by way of touch input 115 or other selection. This might involve a swiping movement by way of touch interface 115. Of course, the information displayed on the control panels 505 and 630 may be combined into a single page as is the case for the control panel 505 in FIG. 27, albeit in book mode as opposed to can mode.

Figure 30:
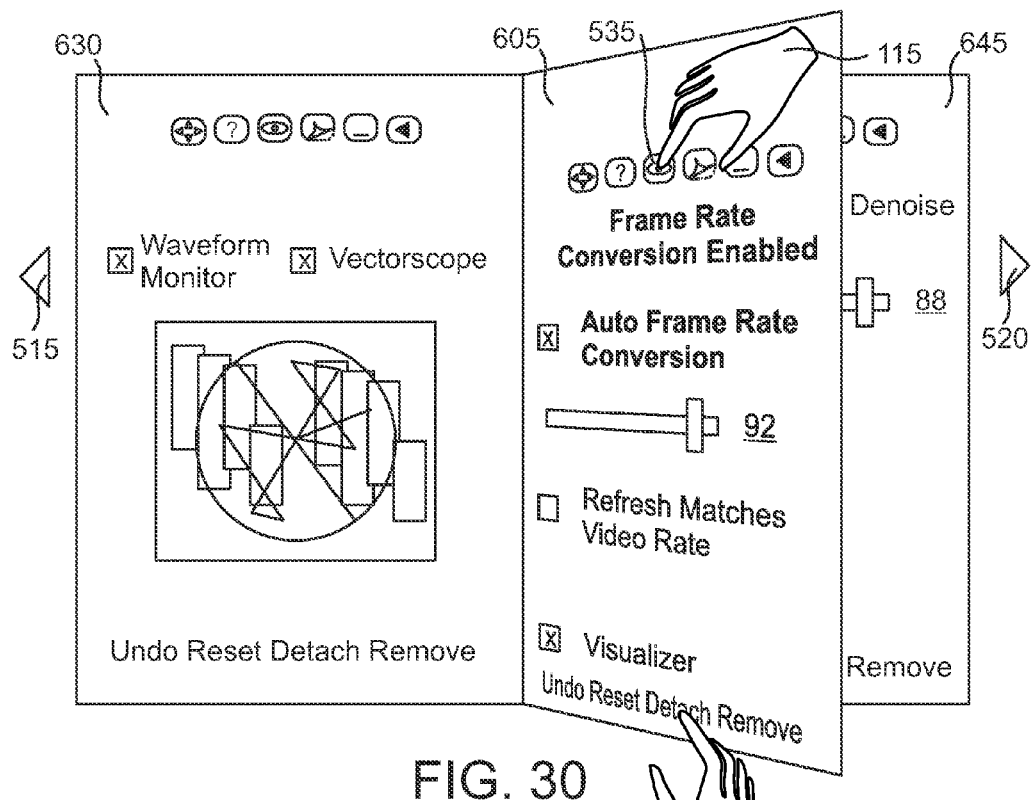
FIG. 30 is a pictorial view like FIG. 29, but depicting exemplary scrolling of the exemplary control panels in exemplary book mode.

Toggling to a succeeding page will be described now in conjunction with FIGS. 29 and 30. Assume for the purposes of this illustration that control panel 630 is turned by selecting the glyph 520 or a swiping movement. At this point, the control panel 630 moves to a front facing position as shown in FIG. 30 and the control panel 605 is brought into view. At this point, any or all of the control panels 630, 605 and the now partially revealed control panel 645 may be enabled. Thus, the user may be able to make input to any of the control panels 630, 605 and 645 as desired. Conversely, the user at this point can disable a given control panel in book mode by touching the appropriate portion of a given control panel. In this illustration, the next page 645 is a control panel to enable the user to select some level of noise suppression, i.e., Denoise. A non-exhaustive list of the types of filters that may be presented to the user via control panels in any of the disclosed embodiments includes stabilization, motion compensated frame rate conversion, super resolution (scaling), noise reduction, contour reduction, detail enhancement, color enhancement, standard color adjustments, flesh tone enhancement, video gamma, deinterlacing, pulldown or cadence correction, edge enhancement, denoise, split screen modes, enforce smooth video playback, mosquito noise reduction, deblocking, brighter whites, red, green, blue stretch, dynamic contrast enhancement, color range and color space, video pop, deblurring and 2D to 3D conversion.

Figure 31:
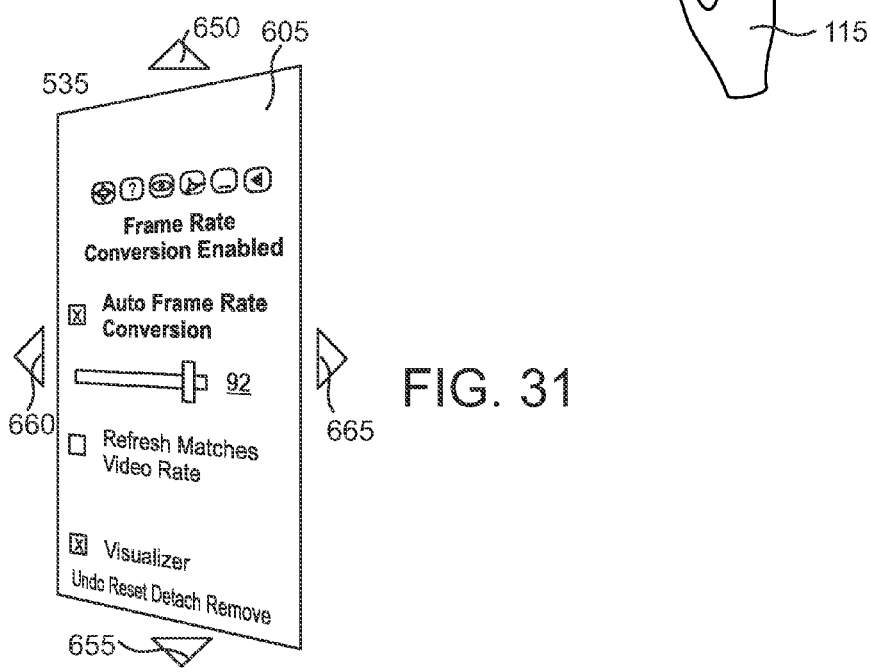
FIG. 31 is a pictorial view depicting the detachment of an exemplary control panel from the arrangement of control panels shown in FIG. 30.

A given control panel may be detached from the book and moved elsewhere on the display as desired. For example, assume that by way of touch input, the detached menu item on the control panel 605 is selected. At this point, the control panel 605 is detached and presented rendered as shown in FIG. 31. At this point, up, down, left and right glyphs 650, 655, 660 and 665, respectively, may appear to enable the user to move the control panel 605 to a desired location on a display. While detached, any of the input areas of the control panel 605 may be manipulated by the user as desired. The movement glyphs 650, 655, 660 and 665 may be initially disabled but visible, and the move icon 525 highlighted. If upon user selection of the move icon 525, the movement glyphs 650, 655, 660 and 665 become saturated and the user may select one of those to move the control panel 605 elsewhere on a display. Invoking a back command in one way or another will disable the movement glyphs 650, 655, 660 and 665 and enable further toggling of the pages 630 and 645 shown in FIG. 30 by way of the glyphs 515 and 520. If a detached control panel, such as the panel 605 shown in FIG. 31, is removed by selection of the Remove footer menu item then not only will the control panel 605 close and be unavailable until selected again by way of the ring control interface 145 shown in FIG. 24 but user input focus will return automatically to the left-hand page 630 shown in FIG. 30.

Figure 32:
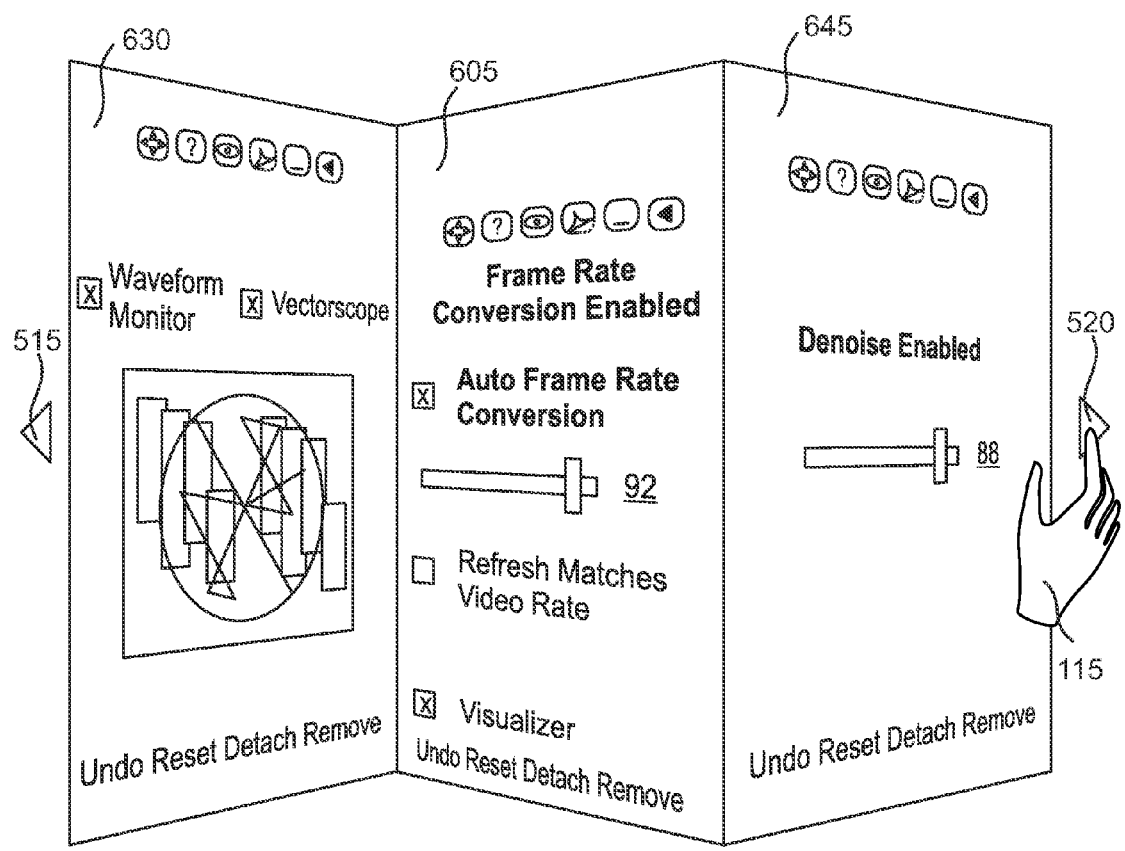
FIG. 32 is a pictorial view of a few exemplary control panels in exemplary accordion mode.
Figure 33:
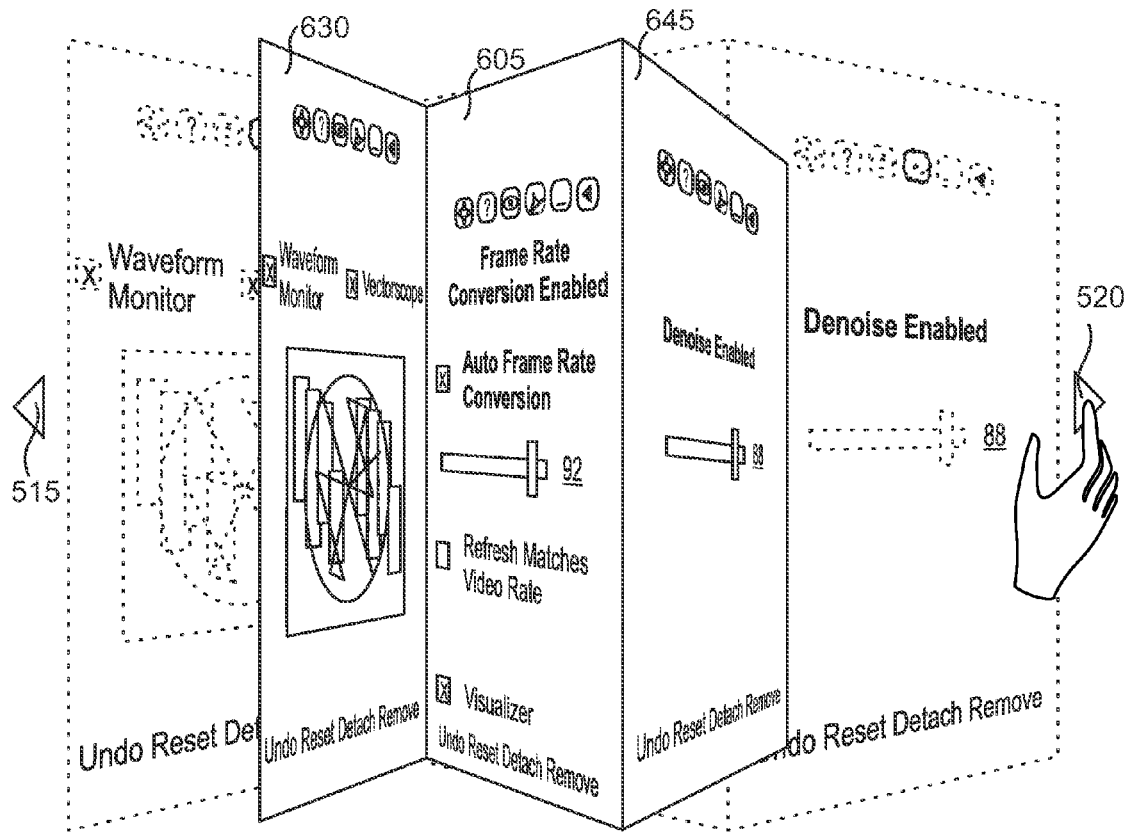
FIG. 33 is a pictorial view like FIG. 32, but depicting exemplary folding of the control panels in exemplary accordion mode.

Referring again briefly to FIG. 30, the visual mode may be toggled from the book mode shown in FIG. 30 to accordion mode by again selecting the mode toggle icon 535. Upon selection, the display toggles to accordion mode as shown in FIG. 32. Here, the control panels 630, 605 and 645 are displayed in accordion mode much like the folds of an accordion. To facilitate the accordion-like appearance of accordion mode, the control panels 630, 605 and 645, including not only the icons but also any text, may be depicted in perspective as shown in FIG. 32. In accordion mode in the state shown in FIG. 32, the control panel 645 for Denoise is now visible and arranged like an accordion with the control panels 630 and 605. The control panel that is in focus may be provided with some visual indicator or pop to reflect input focus. This may be provided by change in colors, line weight, highlighting, transparency or other. In still another option, the panel in focus may be shown face on. In this arrangement, the glyphs 515 and 520 serve a slightly different function. Tapping or otherwise selecting the right-hand glyph 520 will cause the accordion arrangement of the control panels 630, 605 and 645 to fold up incrementally, while doing the same repetitive selection of the glyph 515 will cause the accordion to expand incrementally. For example, assume for the purposes of this illustration that the right-hand glyph 520 is repeatedly selected by touch input 115. With those inputs, the control panels 630, 605 and 645 incrementally fold up from the state shown in FIG. 33 in dashed to the incrementally folded up state shown.

Figure 34:
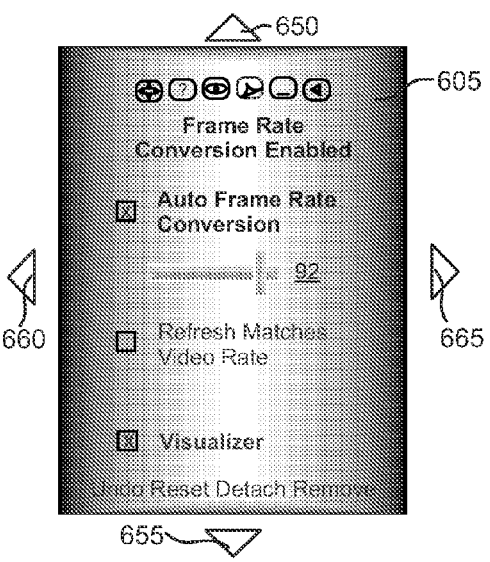
FIG. 34 is pictorial view of an exemplary control panel detached and exhibiting exemplary texture mapping induced texturing.

A variety of 3D effects may be applied to control panels in addition to perspective, book page and accordion renderings. Indeed, additional texture mapping may be applied to a give control panel or only portions thereof to provide a 3D textured appearance. For example, FIG. 34 depicts the control panel 605 detached and front-facing. Texture mapping may be applied to give the control panel 605, the slider thereof and the movement glyphs 650, 655, 660 and 665 a 3D textured appearance. In this illustration, a blend is used to provide the texturing, but virtually any type of texturing may be used, such as beveling, contouring, shading or other. The VPP or other software described herein may include shader engines that are configured to provide any desired shading for control panel or other interface texturing concurrently with video processing for displayed video, compressed video, or transcoded video.

Figure 35:
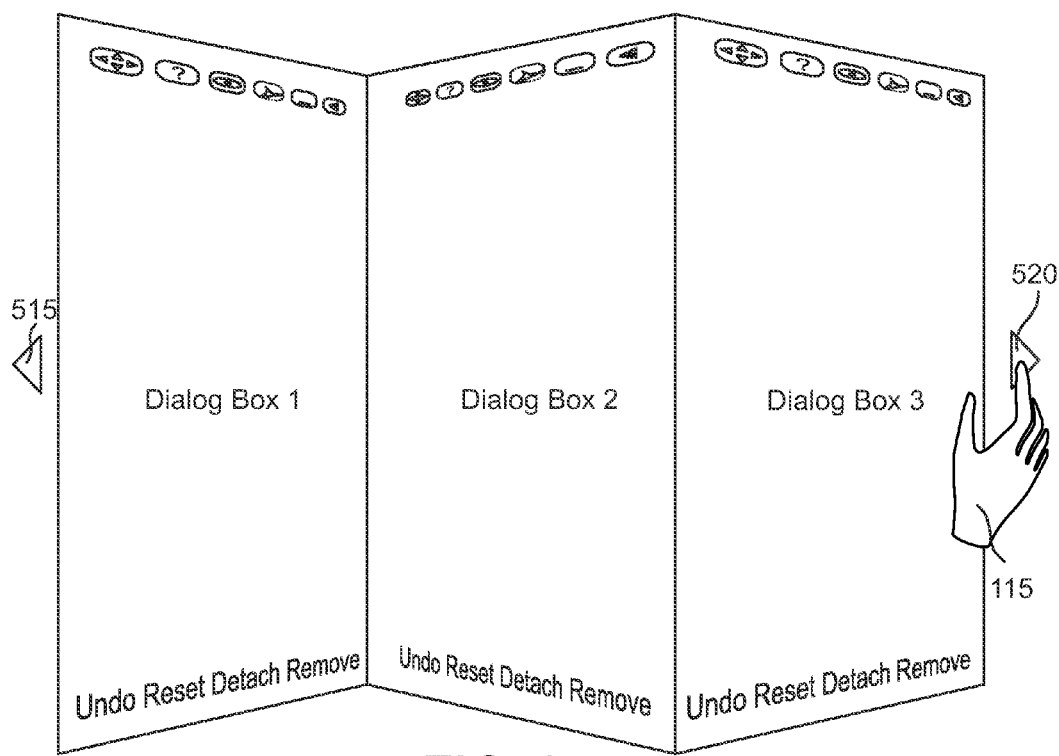
FIG. 35 is a pictorial view of an exemplary set of generalized software dialog boxes arranged in an exemplary accordion mode.
Figure 36:
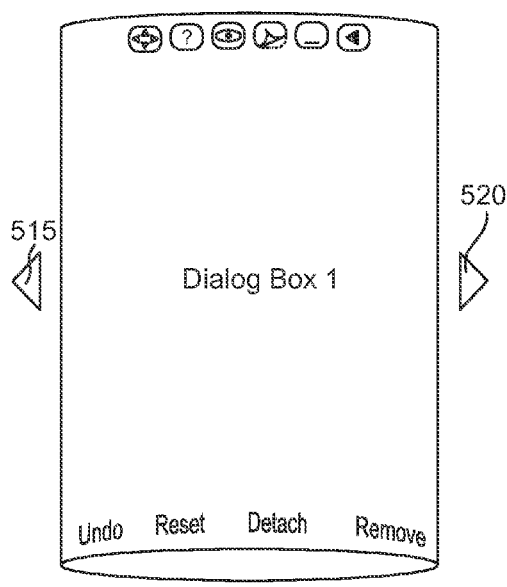
FIG. 36 is a pictorial view of an exemplary set of generalized software dialog boxes arranged in an exemplary can mode.

In the foregoing illustrative embodiments, the control panels have been described in conjunction with the VPP software 15 shown in FIG. 1 and described elsewhere herein. However, the skilled artisan will appreciate that the use of control panels in various toggling modes, such as can, book and accordion, may be used to enable user input to other than video software. Thus, the design and arrangement of control panels as just described may be used with a more generalized computer system such as that depicted in FIG. 22 and in particular with a ring control interface software 415 described in conjunction therewith. Attention is now turned to FIGS. 22 and 34. FIG. 35 is a schematic view of three dialogue boxes, Dialogue Box 1, Dialogue Box 2 and Dialogue Box 3, which may be dialogue boxes depicting any of the large variety of different types of user input screens or panels for any type of software. Again using the simple example of a word processor program depicted visually on the display 20 in FIG. 22, the Dialogue Boxes 1, 2 and 3 may be arranged in an accordion arrangement as shown in FIG. 34 and manipulated by the user as generally described elsewhere herein for the accordion mode control panels. Thus, the Dialogue Box 1 might be, for example, a print dialogue box, the Dialogue Box 2 might be, for example, a font selection dialogue box and the Dialogue Box 3 might be, for example, a paragraph formatting dialogue box. These are just a few of the myriad of examples that might be implemented using accordion mode and the Dialogue Boxes 1, 2 and 3. Optionally, the dialogue boxes 1, 2 and 3 in the accordion mode depicted in FIG. 34 could be used to interface directly with functions associated with the operating system software 40.

Figure 37:
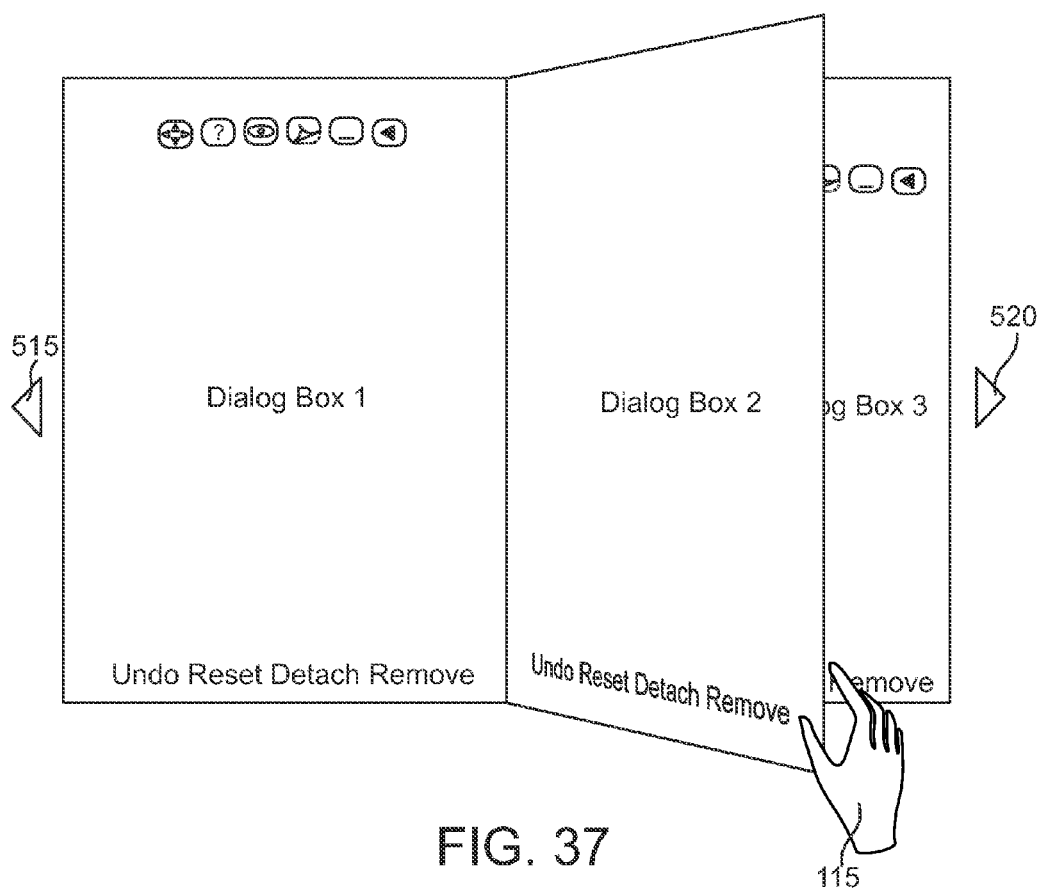
FIG. 37 is a pictorial view of an exemplary set of generalized software dialog boxes arranged in an exemplary book mode.

Can mode may be used for scrolling between Dialogue Boxes 1, 2 and 3 shown in FIG. 35. Here in FIG. 36 Dialogue Box 1 is visible but selection of the left or right glyphs 515 and 520 may bring up Dialogue Boxes 2 and 3. Furthermore, and as shown in FIG. 37, book mode might be enabled to describe generally elsewhere herein but for Dialogue Boxes 1, 2 and 3 and the Dialogue Boxes 1, 2 and 3 may be manipulated in book mode as generally described elsewhere herein.

As noted above, the implementation of the software embodiments disclosed herein is not dependent upon a particular programming language. In one embodiment suitable for use in a Windows® environment, the .NET framework version 4.0 client profile for 32-bit or 64-bit systems along with an AMD multi-media driver library may be used to implement the VPP software 15 depicted in FIGS. 1 and 24 and the ring control software 415 depicted in FIG. 22. It is desirable for the VPP software 15 to utilize the multi-media driver library in order to take advantage of the video acceleration capabilities of, for example, the video processor 25 depicted in FIG. 1.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. In a system having a processor, a display and a selection device, a method of providing and selecting multiple control panels on the display, the method comprising:
   providing a user interface on the display, the user interface including the multiple control panels arranged as book pages with at least one of the book pages appearing in 3D, the book pages being user-scrollable to selectively bring each of the multiple control panels into and out of user focus,
   wherein at least one of the control panels presents information related to adjusting a video characteristic,
   wherein the user interface further comprises a ring and a menu,
   the first ring having an axis and being user-scrollable about the axis to selectively bring items of the menu into and out of sight, and user selection of at least one of the items of the menu causing the book pages to appear in 3D.

2. The method of claim 1, wherein at least one of the control panels is operable to perform a function in response to user input.

3. The method of claim 2, wherein the function comprises adjusting a video characteristic.

4. The method of claim 1, wherein the user interface is operable to receive user input by touch, gesture, pen, remote control, mouse or keyboard.

5. In a system having a processor, a display and a selection device, a method of providing and selecting multiple control panels on the display, the method comprising:
   providing a user interface on the display, the user interface including the multiple control panels arranged as 3D accordion folds, the multiple control panels being user-scrollable to selectively bring each of the multiple control panels into and out of user focus,
   wherein at least one of the control panels presents information related to adjusting a video characteristic,
   wherein the user interface further comprises a ring and a menu,
   the ring having an axis and being user-scrollable about the axis to selectively bring items of the menu into and out of sight, and user selection of at least one of the items of the menu causing the multiple control panels to appear as 3D accordion folds.

6. The method of claim 5, wherein at least one of the control panels is operable to perform a function in response to user input.

7. The method of claim 6, wherein the function comprises adjusting a video characteristic.

8. The method of claim 5, wherein the user interface is operable to receive user input by touch, gesture, pen, remote control, mouse or keyboard.

9. A method, comprising:
   providing a computer system; and
   providing a user interface on the computer system, the user interface including multiple control panels arranged as book pages with at least one of the book pages appearing in 3D, the book pages being user-scrollable to selectively bring each of the multiple control panels into and out of user focus,
   wherein at least one of the control panels presents information related to adjusting a video characteristic,
   wherein the user interface further comprises a ring and a menu,
   the first ring having an axis and being user-scrollable about the axis to selectively bring items of the menu into and out of sight, and user selection of at least one of the items of the menu causing the book pages to appear in 3D.

10. A method, comprising:
providing a computer system; and
providing a user interface on the computer system, the user interface including multiple control panels arranged as 3D accordion folds, the multiple control panels being user-scrollable to selectively bring each of the multiple control panels into and out of user focus,
wherein at least one of the control panels presents information related to adjusting a video characteristic,
wherein the user interface further comprises a ring and a menu,
the ring having an axis and being user-scrollable about the axis to selectively bring items of the menu into and out of sight, and user selection of at least one of the items of the menu causing the multiple control panels to appear as 3D accordion folds.

11. A system for displaying video, comprising:
a processor programmed to provide a user interface on a display, the user interface including multiple control panels arranged as 3D accordion folds or as book pages with at least one of the book pages appearing in 3D, the accordion folds or book pages being user-scrollable to selectively bring each of the multiple control panels into and out of user focus,
wherein at least one of the control panels presents information related to adjusting a video characteristic,
wherein the user interface further comprises a ring and a menu,
the first ring having an axis and being user-scrollable about the axis to selectively bring items of the menu into and out of sight, and user selection of at least one of the items of the menu causing the book pages to appear in 3D.

12. A non-transitory computer readable medium having computer readable instructions for performing a method comprising:
displaying a user interface on a display device, the user interface including multiple control panels arranged as 3D accordion folds or as book pages with at least one of the book pages appearing in 3D, the accordion folds or book pages being user-scrollable to selectively bring each of the multiple control panels into and out of user focus,
wherein at least one of the control panels presents information related to adjusting a video characteristic,
wherein the user interface further comprises a ring and a menu,
the ring having an axis and being user-scrollable about the axis to selectively bring items of the menu into and out of sight, and user selection of at least one of the items of the menu causing the multiple control panels to appear as 3D accordion folds.

* * * * *